United States Patent
Xiang et al.

(10) Patent No.: US 12,518,825 B2
(45) Date of Patent: Jan. 6, 2026

(54) HIGH VOLTAGE SWITCHES FOR NAND FLASH MEMORY

(71) Applicant: Yangtze Memory Technologies Co., Ltd., Hubei (CN)

(72) Inventors: Li Xiang, Hubei (CN); Ming Yang, Hubei (CN); Wei Huang, Hubei (CN)

(73) Assignee: Yangtze Memory Technologies Co., Ltd., Hubei (CN)

( * ) Notice: Subject to any disclaimer, the term of this patent is extended or adjusted under 35 U.S.C. 154(b) by 183 days.

(21) Appl. No.: 18/145,629

(22) Filed: Dec. 22, 2022

(65) Prior Publication Data

US 2024/0170065 A1 May 23, 2024

(30) Foreign Application Priority Data

Nov. 23, 2022 (CN) .......................... 202211475972.7

(51) Int. Cl.
| | |
|---|---|
| *G11C 16/12* | (2006.01) |
| *G11C 16/04* | (2006.01) |
| *G11C 16/08* | (2006.01) |
| *G11C 16/10* | (2006.01) |

(52) U.S. Cl.
CPC .......... *G11C 16/0425* (2013.01); *G11C 16/08* (2013.01); *G11C 16/102* (2013.01); *G11C 16/12* (2013.01)

(58) Field of Classification Search
CPC ... G11C 16/0425; G11C 16/08; G11C 16/102; G11C 16/12; G11C 11/5628; G11C 11/5671; G11C 16/32; G11C 16/3427; G11C 16/0483; G11C 16/10; G11C 5/148; G11C 5/145; G11C 8/08

See application file for complete search history.

(56) References Cited

U.S. PATENT DOCUMENTS

| | | | | |
|---|---|---|---|---|
| 6,614,292 | B1 * | 9/2003 | Chung ................... | G11C 5/145 327/536 |
| 7,269,068 | B2 * | 9/2007 | Chae ...................... | G11C 16/10 365/185.17 |
| 9,698,676 | B1 * | 7/2017 | Huynh .................... | H02M 3/07 |
| 11,056,155 | B1 * | 7/2021 | Trinh ...................... | G11C 16/10 |
| 2002/0133679 | A1 * | 9/2002 | Choi .................. | G11C 16/3409 711/154 |
| 2003/0048689 | A1 * | 3/2003 | Kim ........................ | G11C 8/08 365/230.06 |
| 2004/0080980 | A1 * | 4/2004 | Lee ........................ | G11C 16/12 365/185.17 |

(Continued)

*Primary Examiner* — Jay W. Radke
(74) *Attorney, Agent, or Firm* — Conley Rose, P.C.

(57) ABSTRACT

The present disclosure provides a high voltage (HV) switch system for a memory device that includes a first switch configured to transfer a boost voltage during a first time period to a first set of selected word lines or a second set of selected word lines of the memory device; a second switch configured to transfer a target regulated voltage during a second time period to the first set of the selected word lines when programming a first set of memory cells coupled to the first set of the selected word lines; and a third switch configured to transfer the target regulated voltage during the second time period to the second set of the selected word lines that is different from the first set of word lines when programming a second set of memory cells coupled to the second set of the selected word lines.

20 Claims, 13 Drawing Sheets

(56) References Cited

U.S. PATENT DOCUMENTS

| | | | | |
|---|---|---|---|---|
| 2005/0024974 A1* | 2/2005 | Noguchi | G11C 29/52 | 714/E11.034 |
| 2005/0232013 A1* | 10/2005 | Kawai | G11C 16/30 | 365/185.18 |
| 2006/0077736 A1* | 4/2006 | Nakagawa | G11C 29/50004 | 365/201 |
| 2006/0092703 A1* | 5/2006 | Chae | G11C 16/10 | 365/185.18 |
| 2007/0019474 A1* | 1/2007 | Kim | G11C 16/10 | 365/185.18 |
| 2007/0064512 A1* | 3/2007 | Kim | G11C 16/12 | 365/218 |
| 2007/0109862 A1* | 5/2007 | Kim | G11C 16/30 | 365/185.23 |
| 2007/0268751 A1* | 11/2007 | Byeon | G11C 5/145 | 365/189.11 |
| 2009/0097325 A1* | 4/2009 | Won | G11C 16/3454 | 365/189.11 |
| 2009/0231919 A1* | 9/2009 | Won | G11C 16/16 | 365/185.13 |
| 2010/0027332 A1* | 2/2010 | Lee | G11C 16/3454 | 365/185.25 |
| 2012/0008384 A1* | 1/2012 | Li | G11C 29/02 | 365/185.33 |
| 2012/0008405 A1* | 1/2012 | Shah | G11C 29/702 | 365/185.22 |
| 2012/0008410 A1* | 1/2012 | Huynh | G11C 29/028 | 365/185.21 |
| 2012/0033501 A1* | 2/2012 | Park | H10B 43/27 | 365/185.18 |
| 2012/0155168 A1* | 6/2012 | Kim | G11C 5/14 | 365/185.23 |
| 2012/0281479 A1* | 11/2012 | Kochar | G11C 16/3459 | 365/185.19 |
| 2013/0063118 A1* | 3/2013 | Nguyen | G11C 5/145 | 323/304 |
| 2013/0107654 A1* | 5/2013 | Kang | G11C 5/145 | 365/226 |
| 2014/0084936 A1* | 3/2014 | Pan | G01R 19/0092 | 324/509 |
| 2014/0085985 A1* | 3/2014 | Pan | G11C 16/06 | 327/536 |
| 2017/0084339 A1* | 3/2017 | Son | G11C 16/08 | |
| 2017/0109527 A1* | 4/2017 | Kim | G11C 16/08 | |
| 2017/0316834 A1* | 11/2017 | Huynh | G11C 16/3422 | |
| 2018/0068706 A1* | 3/2018 | Yoo | G11C 8/10 | |
| 2018/0197608 A1* | 7/2018 | Song | G11C 16/3495 | |
| 2021/0398602 A1* | 12/2021 | Lakshminarayana Addagalla | G11C 16/0483 | |
| 2022/0172790 A1* | 6/2022 | Lee | G11C 5/145 | |
| 2023/0104865 A1* | 4/2023 | Cho | G11C 16/0483 | 365/185.27 |
| 2023/0207014 A1* | 6/2023 | Ito | G11C 16/30 | 365/185.11 |
| 2023/0268008 A1* | 8/2023 | He | G11C 16/0433 | 365/185.29 |
| 2024/0170065 A1* | 5/2024 | Xiang | G11C 16/10 | |
| 2024/0242765 A1* | 7/2024 | Yoon | H10B 43/27 | |

* cited by examiner

HIGH VOLTAGE SWITCHES FOR NAND FLASH MEMORY

CROSS-REFERENCE TO RELATED APPLICATIONS AND INCORPORATION BY REFERENCE

This application claims priority to Chinese Patent Application No. 202211475972.7, filed on Nov. 23, 2022, which is incorporated herein by reference in its entirety.

TECHNICAL FIELD

The present disclosure generally relates to the field of semiconductor technology, and more particularly, to circuits and methods for providing high voltages for a NAND flash memory.

BACKGROUND

Programming memory cells for a NAND flash memory requires voltages higher than that of a power supply for the memory device. For example, during a programming operation, selected word lines are applied with a programming voltage (e.g., 15-20 V) such that charge carriers (e.g., electrons) can be injected into the memory films of the selected memory cells. Injected charge carriers can be trapped and thereby stored in the memory films of the selected memory cells. Storage data of a NAND flash memory depend on the number of charge carriers injected and stored in the memory cells. To achieve fast and reliable programming, a programming operation can include various stages (e.g., a channel boosting stage and a program pulsing stage) and various high voltages (e.g., a boost voltage and a programming voltage). Therefore, a need exists for providing high voltages to the NAND flash memory to perform the programming operation.

BRIEF SUMMARY

Embodiments of circuits and methods for providing high voltages for programming a NAND flash memory are described in the present disclosure.

One aspect of the present disclosure provides a high voltage (HV) switch system for a memory device, the HW switch system includes a first switch configured to transfer a boost voltage during a first time period to a first set of selected word lines or a second set of selected word lines of the memory device; a second switch configured to transfer a target regulated voltage during a second time period to the first set of selected word lines when programming a first set of memory cells coupled to the first set of selected word lines; and a third switch configured to transfer the target regulated voltage during the second time period to the second set of selected word lines that is different from the first set of selected word lines when programming a second set of memory cells coupled to the second set of selected word lines. First terminals of the first switch, the second switch and the third switch are electrically connected to an output node of the HV switch system; and second terminals of the first switch, the second switch and the third switch are coupled to the boost voltage, a first regulated voltage, and a second regulated voltage, respectively.

In some embodiments, the first switch, the second switch and the third switch each comprises a metal-oxide-semiconductor field effect transistor (MOSFET), wherein the first terminal and the second terminal of the first switch, the second switch and the third switch are the source and drain terminals, respectively.

In some embodiments, the output node of the HV switch system is coupled to a row decoder/word-line driver of the memory device, the row decoder/word-line driver of the memory device configured to transfer the boost voltage during the first time period to the first set of selected word lines or the second set of selected word lines; transfer the target regulated voltage during the second time period to the first set of selected word lines when programming the first set of memory cells; and transfer the target regulated voltage during the second time period to the second set of selected word lines when programming the second set of memory cells.

In some embodiments, when programming the first set of memory cells, the first regulated voltage is the target regulated voltage during the first time period and the second time period.

In some embodiments, the second regulated voltage is the target regulated voltage during the second time period.

In some embodiments, when programming the second set of memory cells, the second regulated voltage is the target regulated voltage during the first time period and the second time period. In some embodiments, the first regulated voltage is the target regulated voltage during the second time period.

In some embodiments, when programming the first set of memory cells, the first regulated voltage is a pre-target regulated voltage during the first time period and is the target regulated voltage during the second time period, wherein the pre-target regulated voltage is lower than the target regulated voltage. In some embodiments, the second regulated voltage is the target regulated voltage during the second time period. In some embodiments, the pre-target regulated voltage is lower than the target regulated voltage by a voltage in a range between 1 V and 3 V.

In some embodiments, when programming the second set of memory cells, the second regulated voltage is a pre-target regulated voltage during the first time period and is the target regulated voltage during the second time period, wherein the pre-target regulated voltage is lower than the target regulated voltage. In some embodiments, the first regulated voltage is the target regulated voltage during the second time period. In some embodiments, the pre-target regulated voltage is lower than the target regulated voltage by a voltage in a range between 1 V and 3 V.

In some embodiments, the target regulated voltage is supplied by a HV regulator.

In some embodiments, the target regulated voltage is in a range between 22 V and 26 V. In some embodiments, the boost voltage is in a range between 5 V and 8 V.

Another aspect of the present disclosure also provides a method for programming a memory device, which includes transferring, during a first time period, a boost voltage to a first set of selected word lines or a second set of selected word lines of the memory device through a first switch of a high voltage (HV) switch system of the memory device; and transferring, during a second time period, a target regulated voltage to the first set of the selected word lines through a second switch of the HV switch system, or to the second set of the selected word lines through a third switch of the HV switch system. The second set of the selected word lines are different from the first set of selected word lines; and the first switch, the second switch and the third switch are connected in parallel. The method further includes programming, according to the target regulated voltage, a first set of memory cells coupled to the first set of the selected word lines, or a second set of memory cells coupled to the second set of the selected word lines during the second time period, wherein the target regulated voltage is supplied to the third switch when programming the first set of memory cells, and to the second switch when programming the second set of memory cells.

In some embodiments, the transferring of the boost voltage comprises switching on the first switch and switching off the second switch and the third switch; the transferring of the target regulated voltage to the first set of selected word lines comprises switching off the first switch and the third switch and switching on the second switch; and the transferring of the target regulated voltage to the second set of the selected word lines comprises switching off the first switch and the second switch and switching on the third switch.

In some embodiments, the method further includes supplying, during the first time period, the target regulated voltage to the second switch when transferring the boost voltage to the first set of selected word lines; and supplying, during the first time period, the target regulated voltage to the third switch when transferring the boost voltage to the second set of selected word lines.

In some embodiments, the method also includes supplying, during the first time period, a pre-target regulated voltage to the second switch when transferring the boost voltage to the first set of selected word lines, wherein the pre-target regulated voltage is lower than the target regulated voltage; and supplying, during the first time period, the pre-target regulated voltage to the third switch when transferring the boost voltage to the second set of selected word lines. In some embodiments, the pre-target regulated voltage is lower than the target regulated voltage by a voltage in a range between 1 V and 3 V.

In some embodiments, the target regulated voltage is in a range between 22 V and 26 V, and the boost voltage is in a range between 5 V and 8 V.

Yet another aspect of the present disclosure further provides a memory device that includes a memory array having a first set of memory cells coupled to a first set of selected word lines and a second set of memory cells coupled to a second set of selected word lines. The memory device also includes peripheral circuits having a row decoder/word-line driver; a high voltage (HV) regulator configured to provide a target regulated voltage; and a HV switch system. The HV switch system includes a first switch configured to transfer a boost voltage during a first time period to the first set of selected word lines or the second set of selected word lines; a second switch configured to transfer the target regulated voltage during a second time period to the first set of the selected word lines when programming the first set of memory cells; and a third switch configured to transfer the target regulated voltage during the second time period to the second set of the selected word lines that is different from the first set of word lines when programming the second set of memory cells.

In some embodiments, first terminals of the first switch, the second switch and the third switch are coupled to the row decoder/word-line driver.

In some embodiments, a second terminal of the second switch is coupled to the HV regulator when programming the first set of memory cells.

In some embodiments, a second terminal of the third switch is coupled to the HV regulator when programming the second set of memory cells.

Yet another aspect of the present disclosure also provides a memory system that includes a memory device and a memory controller. The memory device includes a memory array comprising a first set of memory cells coupled to a first set of selected word lines and a second set of memory cells coupled to a second set of selected word lines; and peripheral circuits comprising a row decoder/word-line driver; a high voltage (HV) regulator configured to provide a target regulated voltage; and a HV switch system. The HV switch system includes a first switch configured to transfer a boost voltage during a first time period to the first set of selected word lines or the second set of selected word lines; a second switch configured to transfer the target regulated voltage during a second time period to the first set of the selected word lines when programming the first set of memory cells; and a third switch configured to transfer the target regulated voltage during the second time period to the second set of the selected word lines that is different from the first set of word lines when programming the second set of memory cells. The memory controller configured to send commands to the memory device for programming the first set of memory cells and the second set of memory cells.

Other aspects of the present disclosure can be understood by those skilled in the art in light of the description, the claims, and the drawings of the present disclosure.

BRIEF DESCRIPTION OF THE DRAWINGS

The accompanying drawings, which are incorporated herein and form a part of the specification, illustrate embodiments of the present disclosure and, together with the description, further serve to explain the principles of the present disclosure and to enable a person skilled in the pertinent art to make and use the present disclosure.

Figure 1A:
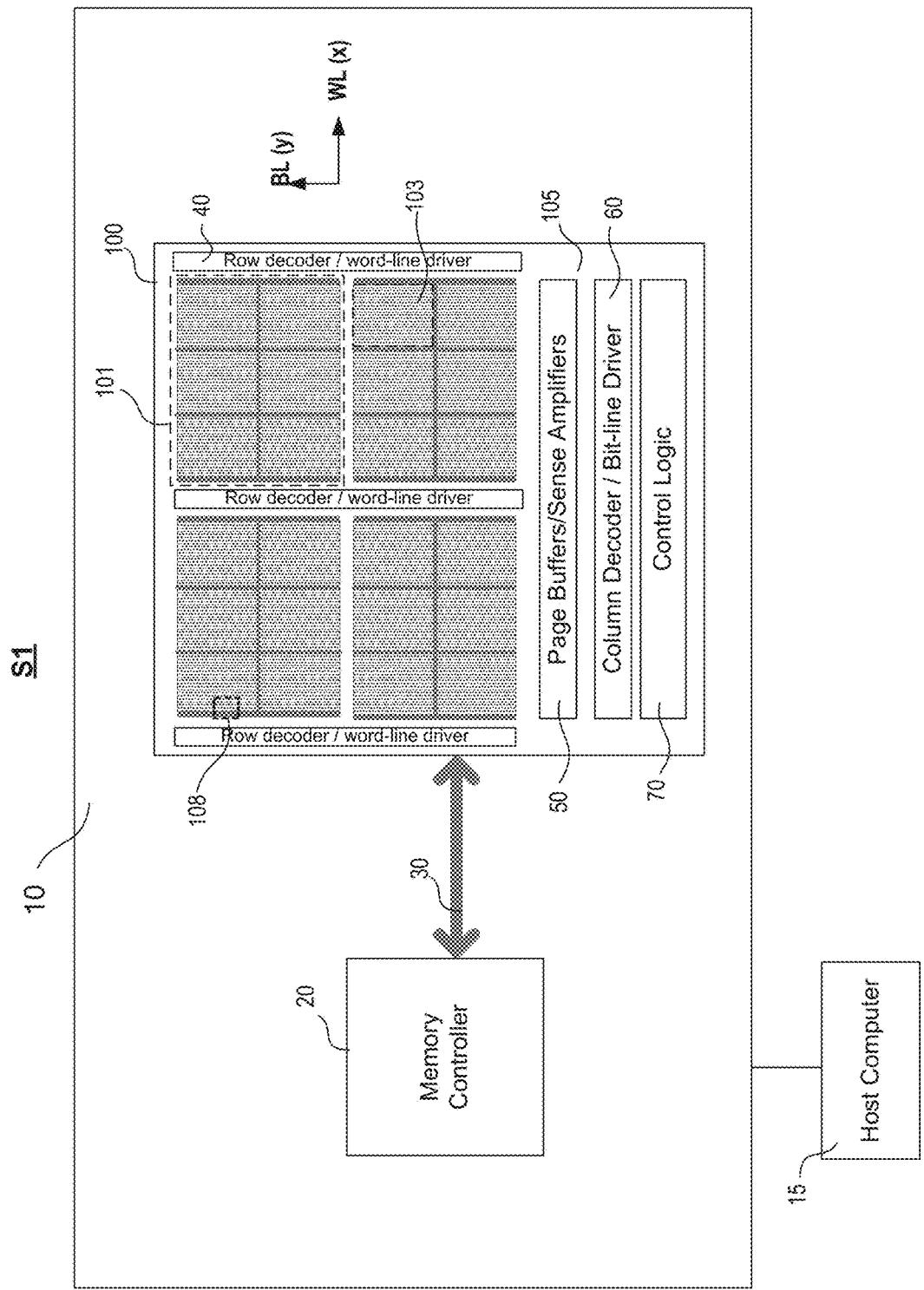
FIGS. 1A-1C illustrate a memory system with a NAND flash memory, according to some embodiments of the present disclosure.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

Embodiments of the present disclosure will be described with reference to the accompanying drawings.

DETAILED DESCRIPTION

Although specific configurations and arrangements are discussed, it should be understood that this is done for illustrative purposes only. A person skilled in the pertinent art will recognize that other configurations and arrangements can be used without departing from the spirit and scope of the present disclosure. It will be apparent to a person skilled in the pertinent art that the present disclosure can also be employed in a variety of other applications.

It is noted that references in the specification to "one embodiment," "an embodiment," "an example embodiment," "some embodiments," etc., indicate that the embodiment described can include a particular feature, structure, or characteristic, but every embodiment can not necessarily include the particular feature, structure, or characteristic. Moreover, such phrases do not necessarily refer to the same embodiment. Further, when a particular feature, structure or characteristic is described in connection with an embodiment, it would be within the knowledge of a person skilled in the pertinent art to affect such feature, structure or characteristic in connection with other embodiments whether or not explicitly described.

In general, terminology can be understood at least in part from usage in context. For example, the term "one or more" as used herein, depending at least in part upon context, can be used to describe any feature, structure, or characteristic in a singular sense or can be used to describe combinations of features, structures or characteristics in a plural sense. Similarly, terms, such as "a," "an," or "the," again, can be understood to convey a singular usage or to convey a plural usage, depending at least in part upon context. In addition, the term "based on" can be understood as not necessarily intended to convey an exclusive set of factors and may, instead, allow for existence of additional factors not necessarily expressly described, again, depending at least in part on context.

As used herein, the term "nominal/nominally" refers to a desired, or target, value of a characteristic or parameter for a component or a process step, set during the design phase of a product or a process, together with a range of values above and/or below the desired value. The range of values can be due to slight variations in manufacturing processes or tolerances. As used herein, the term "about" indicates the value of a given quantity that can vary based on a particular technology node associated with the subject semiconductor device. Based on the particular technology node, the term "about" can indicate a value of a given quantity that varies within.

In the present disclosure, when describing applying a voltage at a certain time, it is not limited to reaching the voltage immediately, but also includes a time period for ramping up or down to reach the voltage.

FIG. 1A illustrates a block diagram of an exemplary system S1 having a memory system 10, according to some embodiments of the present disclosure. System S1 can be a mobile phone, a desktop computer, a laptop computer, a tablet, a vehicle computer, a gaming console, a printer, a positioning device, a wearable electronic device, a smart sensor, a virtual reality (VR) device, an argument reality (AR) device, or any other suitable electronic devices having storage therein. The memory system 10 (also referred to as a NAND memory system) includes a NAND flash memory 100 and a host controller 20 (also referred to as a memory controller). The memory system 10 can communicate with a host computer 15 through the memory controller 20, where the memory controller 20 can be connected to the NAND flash memory 100 via a memory channel 30. In some embodiments, the memory system 10 can have more than one NAND flash memory 100, while each NAND flash memory 100 can be managed by the memory controller 20.

In some embodiments, the host computer 15 can include a processor of an electronic device, such as a central processing unit (CPU), or a system-on-chip (SoC), such as an application processor (AP). The host computer 15 sends data to be stored at the NAND memory system or memory system 10 or retrieves data by reading the memory system 10.

The memory controller 20 can handle I/O requests received from the host computer 15, ensure data integrity and efficient storage, and manage the NAND flash memory 100. The memory channel 30 can provide data and control communication between the memory controller 20 and the NAND flash memory 100 via a data bus.

Figure 1B:
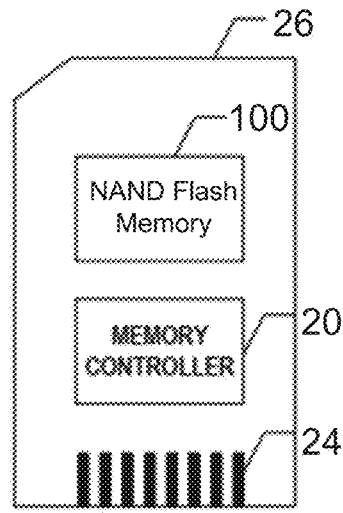
Figure 1C:
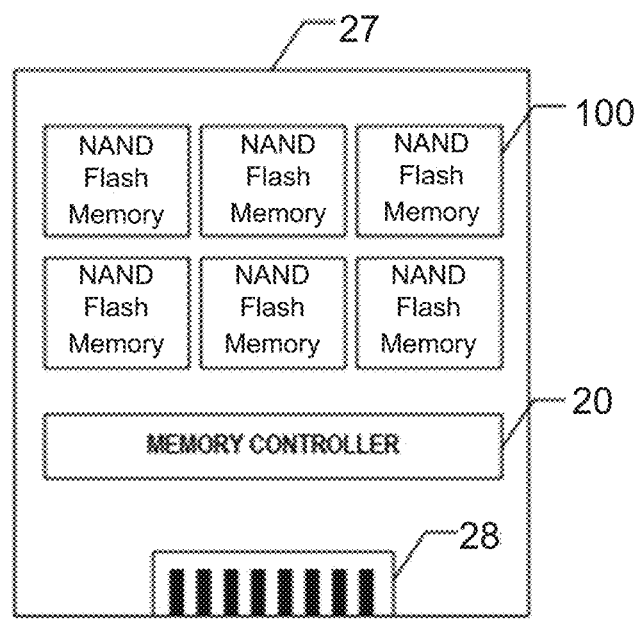

Memory controller 20 and one or more NAND flash memory 100 can be integrated into various types of storage devices, for example, be included in the same package, such as a universal Flash storage (UFS) package or an eMMC package. That is, memory system 10 can be implemented and packaged into different types of end electronic products. In one example as shown in FIG. 1B, memory controller 20 and a single NAND flash memory 100 can be integrated into a memory card 26. Memory card 26 can include a PC card (PCMCIA, personal computer memory card international association), a CF card, a smart media (SM) card, a memory stick, a multimedia card (MMC, RS-MMC, MMCmicro), an SD card (SD, miniSD, microSD, SDHC), a UFS, etc. Memory card 26 can further include a memory card connector 24 coupling memory card 26 with a host (e.g., the host computer 15 in FIG. 16). In another example as shown in FIG. 1C, memory controller 20 and multiple NAND flash memories 100 can be integrated into a solid state drive (SSD) 27. SSD 27 can further include an SSD connector 28 coupling SSD 27 with a host (e.g., the host computer 15 in FIG. 1A).

Referring to FIG. 1A, the NAND flash memory 100 (i.e., "flash," "NAND flash" or "NAND") can be a memory chip (package), a memory die or any portion of a memory die, and can include one or more memory planes 101, each of which can include a plurality of memory blocks 103. Identical and concurrent operations can take place at each memory plane 101. The memory block 103, which can be megabytes (MB) in size, is the smallest size to carry out erase operations. Shown in FIG. 1A, the exemplary NAND flash memory 100 includes four memory planes 101 and each memory plane 101 includes six memory blocks 103. Each memory block 103 can include a plurality of memory cells 108, where each memory cell 108 can be addressed through interconnections such as bit lines and word lines. The bit lines and word lines can be laid out perpendicularly (e.g., in rows and columns, respectively), forming an array of metal lines. The direction of bit lines and word lines are labeled as "BL" and "WL" respectively in FIG. 1A. In this disclosure, one or more memory block 103 can also be referred to as the "memory array" or "array." The memory array is the core area in a memory device, performing storage functions.

The NAND flash memory 100 also includes a peripheral circuit region 105, an area surrounding memory planes 101. The peripheral circuit region 105, also named as peripheral circuits, contains many digital, analog, and/or mixed-signal circuits to support functions of the memory array, for example, page buffers/sense amplifiers 50, row decoders/word line drivers 40, column decoders/bit line drivers 60, and control logic 70. Control logic 70 include register, active and/or passive semiconductor devices, such as transistors, diodes, capacitors, resistors, etc., as would be apparent to a person of ordinary skill in the art. The control logic 70 of the peripheral circuit region 105 can be configured to initiate a program operation on a select memory cell of a NAND memory string in the memory block 103. In some implementations, the control logic 70 receives a program command from a memory controller (e.g., memory controller 20) through interface, and in response, sends control signals to at least row decoder/word line driver, column decoder/bit line driver, and voltage generator deposed in the peripheral circuit region 105 to initiate the program operation on the select memory cell.

It is noted that the layout of the electronic components in the memory system 10 and the NAND flash memory 100 in FIG. 1A are shown as an example. The memory system 10 and the NAND flash memory 100 can have other layout and can include additional components. For example, The NAND flash memory 100 can also have high-voltage charge pumps, I/O circuits, etc. The memory system 10 can also include firmware, data scrambler, etc. In some embodiments, the peripheral circuit region 105 and the memory array can be formed independently on separate wafers and then connected with each other through wafer bonding.

Figure 2:
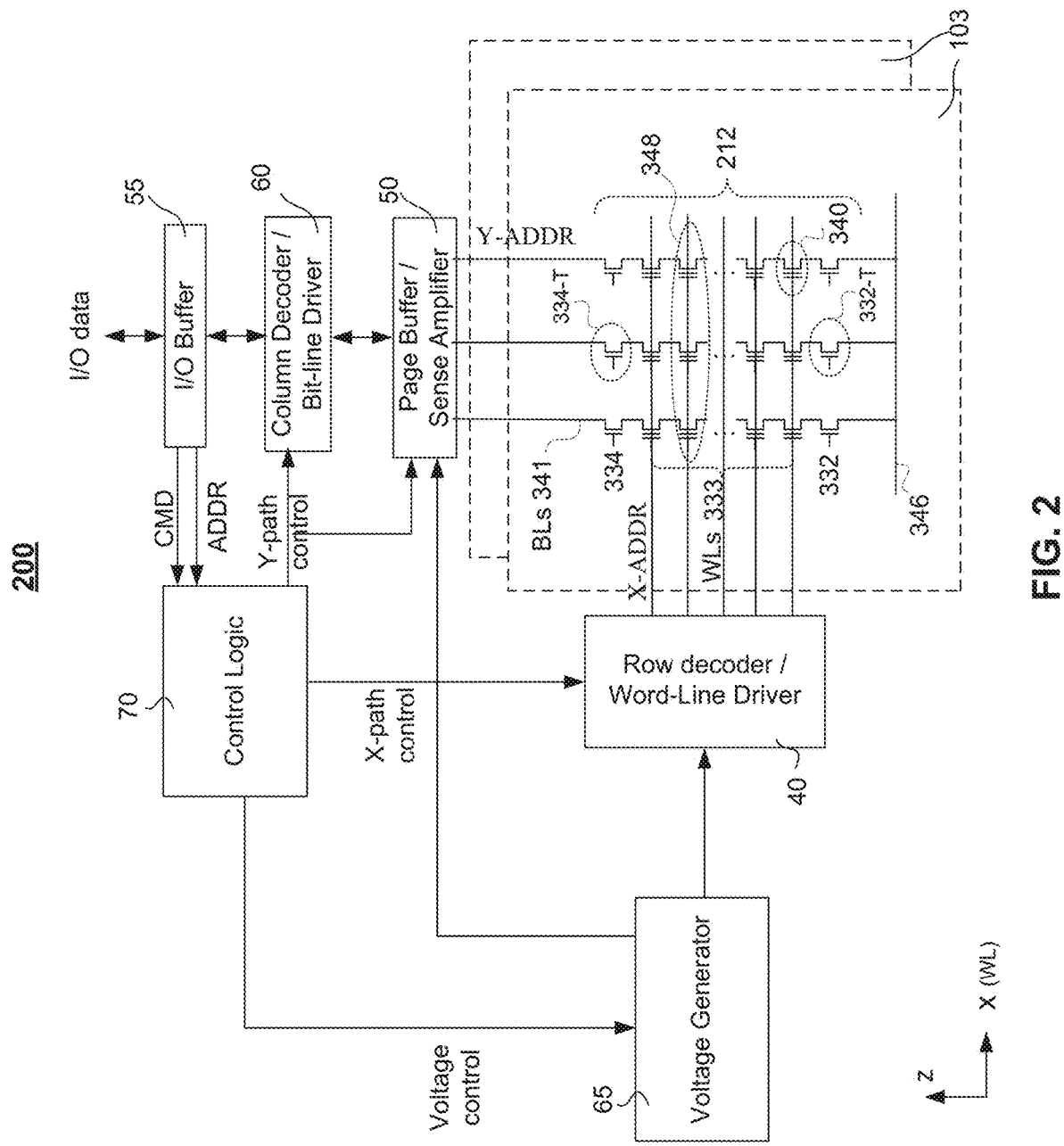
FIG. 2 shows a schematic circuit diagram of a NAND flash memory, according to some embodiments of the present disclosure.

FIG. 2 shows a schematic diagram 200 of the NAND flash memory 100, according to some embodiments of the present disclosure. The NAND flash memory 100 includes one or more memory blocks 103. Each memory block 103 includes memory strings 212. Each memory string 212 includes memory cells 340. The memory cells 340 sharing the same word line forms a memory page 348. The memory string 212 can also include at least one field effect transistor (e.g., MOSFET) at each end, which is controlled by a bottom select gate (BSG) 332 and a top select gate (TSG) 334, respectively. The drain terminal of a top select transistor 334-T can be connected to the bit line 341, and the source terminal of a bottom select transistor 332-T can be connected to an array common source (ACS) 346. The ACS 346 can be shared by the memory strings 212 in an entire memory block, and is also referred to as the common source line.

The NAND flash memory 100 can also include a peripheral circuit that includes many digital, analog, and/or mixed-signal circuits to support functions of the memory block 103, for example, a page buffer/sense amplifier 50, a row decoder/word line driver 40, a column decoder/bit line driver 60, a control logic 70, a voltage generator 65 and an input/output buffer 55. These circuits can include active and/or passive semiconductor devices, such as transistors, diodes, capacitors, resistors, etc., as would be apparent to a person of ordinary skill in the art.

The memory blocks 103 can be coupled with the row decoder/word line driver 40 via word lines ("WLs") 333, bottom select gates ("BSGs") 332 and top select gates ("TSG") 334. The memory blocks 103 can be coupled with the page buffer/sense amplifier 50 via bit lines ("BLs") 341. The row decoder/word line driver 40 can select one of the memory blocks 103 on the NAND flash memory 100 in response to an X-path control signal provided by the control logic 70. The row decoder/word line driver 40 can transfer voltages provided by the voltage generator 65 to the word lines according to the X-path control signal. During the read and programming operation, the row decoder/word line driver 40 can transfer a read voltage $V_{read}$ and a program voltage $V_{pgm}$, respectively, to a selected word line, and transfer a pass voltage $V_{pass}$ to an unselected word line, according to the X-path control signal received from the control logic 70.

The column decoder/bit line driver 60 can transfer an inhibit voltage $V_{inhibit}$ to an unselected bit line and connect a selected bit line to ground according to a Y-path control signal received from the control logic 70. In the other words, the column decoder/bit line driver 60 can be configured to select or unselect one or more memory strings 212 according to the Y-path control signal from the control logic 70. The page buffer/sense amplifier 50 can be configured to read and program (write) data from and to the memory block 103 according to the Y-path control signal from the control logic 70. For example, the page buffer/sense amplifier 50 can store one page of data to be programmed into one memory page 348. In another example, the page buffer/sense amplifier 50 can perform verify operations to ensure that the data has been properly programmed into each memory cell 340. In yet another example, during a read operation, the page buffer/sense amplifier 50 can sense current flowing through the bit line 341 that reflects the logic state (i.e., data) of the memory cell 340 and amplify small signal to a measurable magnification.

The input/output buffer 55 can transfer I/O data from/to the page buffer/sense amplifier 50 as well as addresses ADDR or commands CMD to the control logic 70. In some embodiments, the input/output buffer 55 can function as an interface between the memory controller 20 (in FIG. 1A) and the NAND flash memory 100.

The control logic 70 can control the page buffer/sense amplifier 50 and the row decoder/word line driver 40 in response to the commands CMD transferred by the input/output buffer 55. During the programming operation, the control logic 70 can control the row decoder/word line driver 40 and the page buffer/sense amplifier 50 to program a selected memory cell. During the read operation, the control logic 70 can control the row decoder/word line driver 40 and the page buffer/sense amplifier 50 to read a selected memory cell. The X-path control signal and the Y-path control signal include a row address X-ADDR and a column address Y-ADDR that can be used to locate the selected memory cell in the memory block 103. The row address X-ADDR can include a page index, a block index and a plane index to identify the memory page 348, memory block 103, and memory plane 101 (in FIG. 1A), respectively. The column address Y-ADDR can identify a byte or a word in the data of the memory page 348.

In some implementations, the control logic 70 can include one or more control logic unit. Each control logic unit described herein can be either a software module and/or a firmware module running on a processor, such as a microcontroller unit (MCU), which is part of control logic 70, or a hardware module of a finite-state machine (FSM), such as an integrated circuit (IC, e.g., application-specific IC (ASIC), field-programmable gate array (FPGA), etc.), or a combination of software module, firmware module, and hardware module.

The voltage generator 65 can generate voltages to be supplied to word lines and bit lines under the control of the control logic 70. The voltages generated by the voltage generator 65 include the read voltage $V_{read}$, the program voltage $V_{pgm}$, the pass voltage $V_{pass}$, the inhibit voltage $V_{inhibit}$, etc.

In some embodiments, the NAND flash memory 100 can be formed based on the floating gate technology. In some embodiments, the NAND flash memory 100 can be formed based on charge trapping technology. The NAND flash memory based on charge trapping can provide high storage density and high intrinsic reliability. Storage data or logic states (e.g., threshold voltage Vth of the memory cell 340) depend on the amount of charge trapped in a storage layer. In some embodiments, the NAND flash memory 100 can be a three-dimensional (3D) memory device, where the memory cells 340 can be vertically stacked on top of each other.

Figure 3:
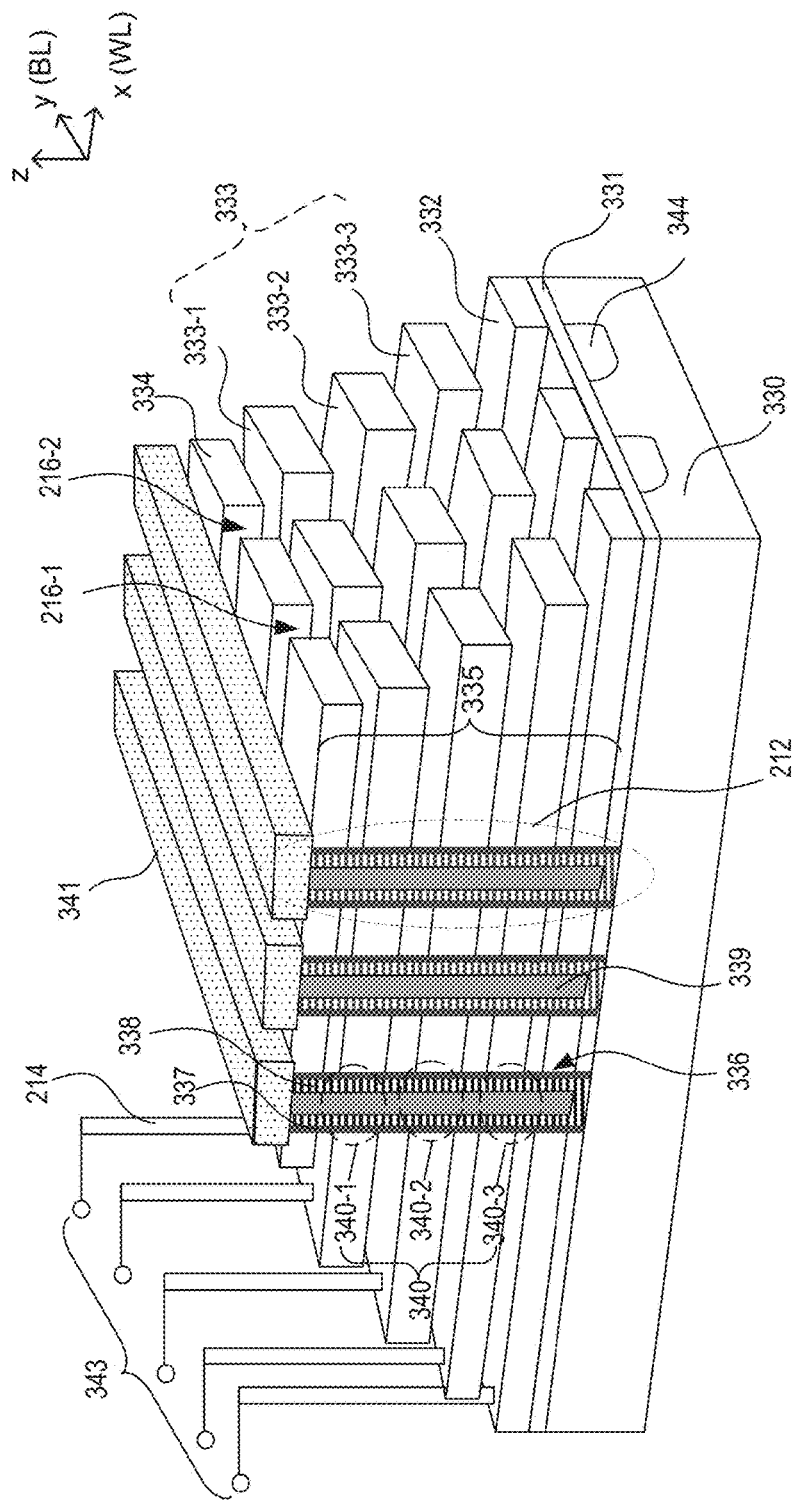
FIG. 3 illustrates a perspective view of a three-dimensional (3D) NAND flash memory, in accordance with some embodiments of the present disclosure.

FIG. 3 illustrates a perspective view of a portion of a 3D NAND flash memory, according to some embodiments of the present disclosure. The 3D NAND flash memory 300 can be a portion of the NAND flash memory 100 and can include a substrate 330, an insulating film 331 over the substrate 330, a tier of bottom select gates (BSGs) 332 over the insulating film 331, and tiers of control gates 333, also referred to as "word lines (WLs)," stacking on top of the BSGs 332 to form a film stack 335 of alternating conductive and dielectric layers. The dielectric layers adjacent to the tiers of control gates are not shown in FIG. 3 for clarity.

The control gates of each tier are separated by slit structures 216-1 and 216-2 through the film stack 335. The 3D NAND flash memory 300 also includes a tier of top select gates (TSGs) 334 over the stack of control gates 333. The stack of TSG 334, control gates 333 and BSG 332 is also referred to as "gate electrodes". The 3D NAND flash memory 300 further includes memory strings 212 and doped source line regions 344 in portions of substrate 330 between adjacent BSGs 332. Each memory strings 212 includes a channel hole 336 extending through the insulating film 331 and the film stack 335 of alternating conductive and dielectric layers. Memory strings 212 also includes a memory film 337 on a sidewall of the channel hole 336, a channel layer 338 over the memory film 337, and a core filler 339 surrounded by the channel layer 338. A memory cell 340 (e.g., 340-1, 340-2, 340-3) can be formed at the intersection of the control gate 333 (e.g., 333-1, 333-2, 333-3) and the memory string 212. A portion of the channel layer 338 responds to the respective control gate is also referred to as the channel layer 338 of the respective memory cell. The 3D NAND flash memory 300 further includes bit lines (BLs) 341 connected with the memory strings 212 over the TSGs 334. The 3D NAND flash memory 300 also includes metal interconnect lines 343 connected with the gate electrodes through contact structures 214. In one implementation, the edge of the film stack 335 is configured in a shape of staircase to allow an electrical connection to each tier of the gate electrodes.

In FIG. 3, for illustrative purposes, three tiers of control gates 333-1, 333-2, and 333-3 are shown together with one tier of TSG 334 and one tier of BSG 332. In this example, each memory string 212 can include three memory cells 340-1, 340-2 and 340-3, corresponding to the control gates 333-1, 333-2 and 333-3, respectively. In some embodiments, the number of control gates and the number of memory cells can be more than three to increase storage capacity. The 3D NAND flash memory 300 can also include other structures, for example, TSG cut, common source contact, array common source and dummy memory string. These structures are not shown in FIG. 3 for simplicity.

In a NAND flash memory, read and programming operations can be performed in a memory page 348, which includes all memory cells 340 sharing the same word line. In a NAND memory, the memory cell 340 can be in an erased state ER or a programmed state P1. To further increase storage density, a memory cell can store n-bit of data and have $2^n$ states in an xLC mode, where n is a positive integer. For example, n equals 1, 2, 3, and 4 for SLC, MLC, TLC and QLC mode, respectively.

During an erase operation, all memory cells 340 in the same memory block 103 can be reset to the erased state ER as a logic "1" by implementing a negative voltage difference between the control gates 333 and source terminals of the memory cells (e.g., the array common source 346) such that all the trapped electronic charges in the storage layer of the memory cells 340 can be removed. For example, the negative voltage difference can be induced by setting the control gates 333 of the memory cells 340 to ground, and applying a high positive voltage to the array common source 346. At the erased state ER ("state ER"), the threshold voltage Vth of the memory cells 340 can be reset to the lowest value, and can be measured or sensed at the bit line 341.

During programming (i.e., writing), the programming voltage $V_{pgm}$ (e.g., a positive voltage pulse between 10 V and 20 V) can be applied on the control gate 333 such that electronic charges (e.g., electrons) can be injected into the storage layer of the memory cell 340, and thereby increase the threshold voltage Vth of the memory cell 340. Thus, the memory cell 340 can be programmed to the programmed state P1 ("state P1"). Likewise, in the xLC mode (SLC, MLC, TLC, QLC, etc.), the state P1, P2, ... $P(2^n-1)$ can be programmed to the memory cells, where threshold voltages Vth of the memory cells increase from the state P1 to the state $P(2^n-1)$. In some embodiments, each state of the xLC mode can be programmed by using an incremental step pulse programming (ISPP) scheme where the programming voltage $V_{pgm}$ can be increased incrementally by a step pulse $V_{step}$. After each ISPP pulse, a verify read can be performed. The memory cells which have reached a target state (i.e., a target threshold voltage) can be inhibited from further programming, for example, by raising the corresponding bit lines to the inhibit voltage $V_{inhibit}$. Otherwise, the memory cells will undergo another cycle of ISPP with the programming voltage $V_{pgm}$ incremented by the step pulse $V_{step}$.

The state of the memory cell (e.g., state ER or state P1) can be determined by measuring or sensing the threshold voltage Vth of the memory cell. During a read operation, the read voltage $V_{read}$ can be applied on the control gate 333 of the memory cell and current flowing through the memory cell can be measured at the bit line 341. For example, if the memory cell is at state ER where the threshold voltage Vth of the memory cell is lower than the read voltage $V_{read}$, the memory cell can be switch on and form a conductive path in the channel. If the memory cell is at the state P1 and the threshold voltage Vth of the memory cell is higher than the read voltage $V_{read}$, the memory cell can be switched off. By measuring or sensing the current through the memory cell at the corresponding bit line, the threshold voltage Vth or the state of the memory cell can be verified.

To program a memory cell to state P1 or higher states, a selected word line ("SEL_WL") needs to be biased at the programming voltage $V_{pgm}$, which can be greater than a first supply voltage $V_{dd}$ of the NAND flash memory 100. In some embodiments, the programming voltage $V_{pgm}$ can include a positive voltage pulse, where the magnitude of the pulse can be in a range between 10 V and 20 V. In some embodiments, the programming voltage $V_{pgm}$ can be increased incrementally by the step pulse $V_{step}$ for the ISPP scheme. In addition to the programming voltage $V_{pgm}$, a boost voltage $V_{boost}$ can be applied to the selected word line at a channel boost step prior to programming. The voltage generator 65, as shown in FIG. 2, can provide various high voltages to the word lines, e.g., the programming voltage $V_{pgm}$ and the boost voltage $V_{boost}$ to the selected word line.

Figure 4:
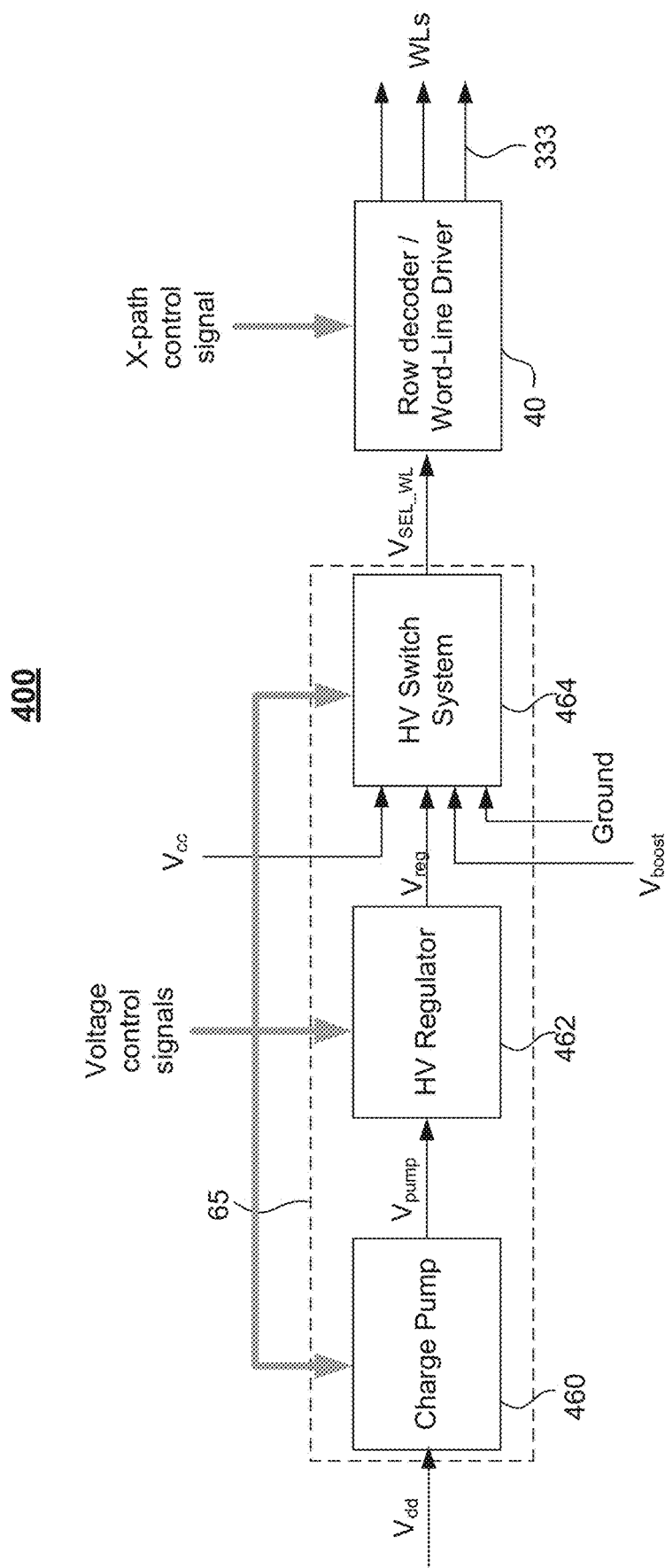
FIG. 4 illustrates a high voltage supply system of a NAND flash memory, according to some embodiments of the present disclosure.

FIG. 4 illustrates a high voltage supply system 400 for word lines of a NAND flash memory, according to some embodiments of the present disclosure. The high voltage supply system 400 includes the voltage generator 65, which can include a charge pump 460, a high voltage ("HV") regulator 462 and a HV switch system 464.

The charge pump 460 can provide a pump voltage $V_{pump}$ greater than the first supply voltage $V_{dd}$. For example, the pump voltage $V_{pump}$ provided by the charge pump 460 can be any voltage in a range between 10 V and 30 V. In some embodiments, the charge pump 460 includes transistors (e.g., n-channel and p-channel MOSFETs), capacitors, etc. In some embodiments, the charge pump 460 includes a voltage doubler circuit.

The HV regulator 462 can filter the pump voltage $V_{pump}$ supplied by the charge pump 460 and provide a regulated voltage $V_{reg}$. In some embodiments, the regulated voltage $V_{reg}$ can be any voltage in a range between 5 V and 25 V. The HV regulator 462 can reduce noises (e.g., ripples) in the pump voltage $V_{pump}$ and obtain a desired voltage value. In some embodiments, the HV regulator 462 can also include transistors (e.g., n-channel and p-channel MOSFETs), capacitors, etc.

The HV switch system 464 can have multiple input voltages, which can include one or more regulated voltages $V_{reg}$ and one or more unregulated voltages. The unregulated voltages can include the boost voltage $V_{boost}$, a ground connection of 0 V, and a second supply voltage $V_{cc}$. In some embodiments, the boost voltage $V_{boost}$ can be any voltage in a range between 5 V to 8 V. In some embodiments, the boost voltage $V_{boost}$ can be 6.5 V. In one example, the boost voltage $V_{boost}$ can be provided by a boost voltage power supply. For simplicity, only one regulated voltage $V_{reg}$ is illustrated in FIG. 4. However, the number of input voltages to the HV switch system 464 is not so limiting and can include any suitable number of regulated voltages and unregulated voltages. In some embodiments, the unregulated voltages can also be regulated instead, and vice versa. The HV switch system 464 can select one of the input voltages and transfer it to an output. In one example, the HV switch system 464 can select a voltage from the regulated voltages $V_{reg}$, the boost voltage $V_{boost}$, 0 V and the second supply voltage $V_{cc}$, and transfer the selected voltage to its output as a selected word line voltage $V_{SEL\_WL}$.

The selected word line voltage $V_{SEL\_WL}$ can then be transferred to the word lines 333 through the row decoder/word-line driver 40. For example, the HV switch system 464 can transfer the selected word line voltage $V_{SEL\_WL}$ for selected word lines for programming operations.

The magnitude and timing of the pump voltage $V_{pump}$, the regulated voltage $V_{reg}$, and the selected word line voltage $V_{SEL\_WL}$ can be controlled by the control logic 70 (as shown in FIG. 2) through one or more control signals (e.g., voltage control signals). And the row decoder/word-line driver 40 can transfer the selected word line voltage $V_{SEL\_WL}$ to corresponding selected word lines based on the X-path control signal from the control logic 70.

For illustration purpose, high voltage transfers for a selected word line during a programming operation will be discussed in detail below. It should be understood that similar circuits and configurations can be implemented for unselected word lines, an erase operation or a read operation by, for example, choosing different voltage values.

Figure 5A:
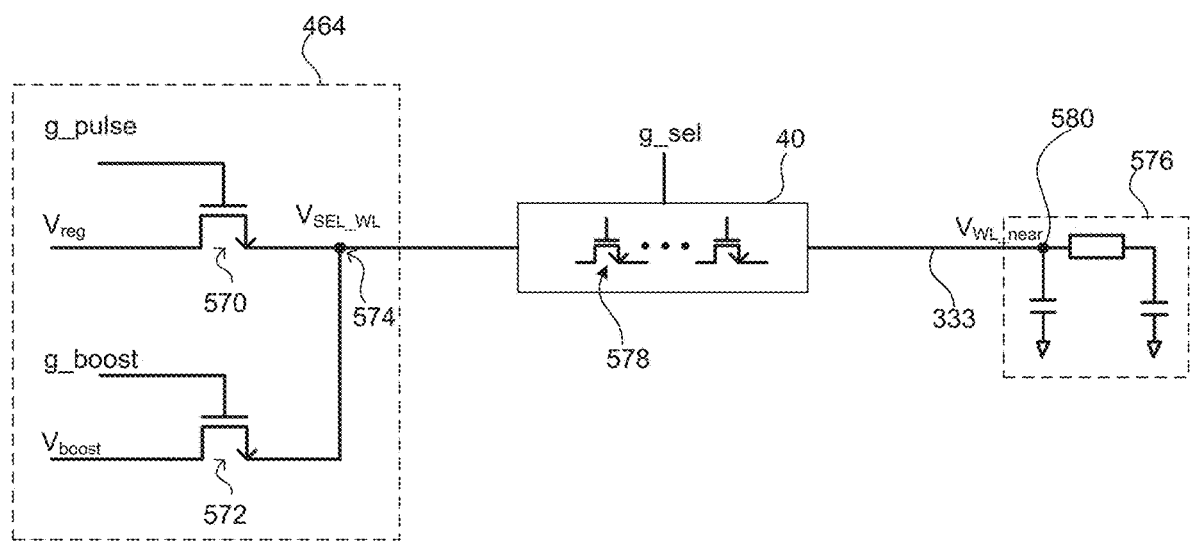
FIG. 5A illustrates a schematic of a high voltage circuitry, according to some embodiments of the present disclosure.

FIG. 5A illustrates a schematic of a high voltage circuitry 500A, according to some embodiments of the present disclosure. The high voltage circuitry 500A includes the HV switch system 464 and a voltage transfer path of the row decoder/word-line driver 40.

In one example, the HV switch system 464 includes a first switch 572 and a second switch 570. The first switch 572 and the second switch 570 can include any suitable transistors, for example, bipolar junction transistors (BJTs), field effect transistors (FETs), etc. In some embodiments, the first switch 572 and the second switch 570 can be metal-oxide-semiconductor field effect transistors (MOSFETs), for example, n-channel MOSFETs. Source terminals (or "first terminals") of the first switch 572 and the second switch 570 can be electrically connected and coupled, for example, to an output node 574, where the selected word line voltage $V_{SEL\_WL}$ can be output by the HV switch system 464. Drain terminals (or "second terminals") of the second switch 570 and the first switch 572 can be coupled to the input voltages of the HV switch system 464, for example, to the regulated voltage $V_{reg}$ provided by the HV regulator 462 (in FIG. 4) and the boost voltage $V_{boost}$, respectively. A gate pulse ("g_pulse") signal and a gate boost ("g_boost") signal can be applied to gate terminals of the second switch 570 and the first switch 572, respectively.

FIG. 5A also illustrates one of the voltage transfer paths of the row decoder/word-line driver 40 and an equivalent circuit 576 of the memory cells coupled to the selected word line 333. The selected word line voltage $V_{SEL\_WL}$ at the output node 574 of the HV switch system 464 can be transferred to the selected word line 333 through one or more pass transistors 578 of the row decoder/word-line driver 40. The row decoder/word-line driver 40 can select a zone (e.g., the memory block 103), a global word line ("GWL"), a local word line ("LWL") and a selected word line ("SEL_WL") according to the X-path control signal sent by the control logic 70 (see FIGS. 2 and 4). According to the X-path control signal, a gate select ("g_sel") signal can be applied to gate terminals of the pass transistors 578. In some embodiments, the pass transistors 578 can be include suitable semiconductor transistors, for example, bipolar junction transistors (BJTs), field effect transistors (FETs), etc. In some embodiments, the pass transistors 578 can be metal-oxide-semiconductor field effect transistors (MOSFETs), for example, n-channel MOSFETs.

The memory cells 334 coupled to the selected word line (e.g., in the same memory page 348 as shown in FIG. 2) can be represented by the equivalent circuit 576, which can include two capacitors connected in parallel and a resistor connected in series with one of the capacitors. An electric potential $V_{WL\_near}$ at a near-word-line ("WL_near") node 580 represents an actual voltage applied to the selected word line. The electric potential $V_{WL\_near}$ can follow the selected word line voltage $V_{SEL\_WL}$ of the HV switch system 464 when all the pass transistors 578 are switched on according to the g_sel signal. Thus, by adjusting the selected word line voltage $V_{SEL\_WL}$ of the HV switch system 464, the electric potential $V_{WL\_near}$ of the selected word line can be regulated.

Figure 5B:
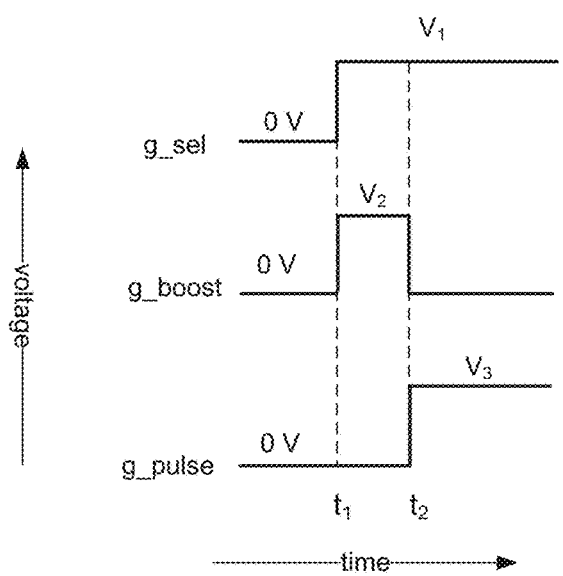
FIG. 5B illustrates waveforms of controls signals applied to a high voltage circuitry, according to some embodiments of the present disclosure.

FIG. 5B illustrates waveforms 500B of controls signals applied to the high voltage circuitry 500A, according to some embodiments of the present disclosure. The control signals include the g_pulse signal, the g_boost signal and the g_sel signal applied to the gate terminals of the second switch 570, the first switch 572 and the pass transistors 578 in FIG. 5A.

At time $t_1$, the g_sel signal and the g_boost signal increase from 0 V to a first voltage $V_1$ and a second voltage $V_2$, respectively, to switch on the pass transistors 578 and the first switch 572. At the time $t_1$, the g_pulse signal remains at 0 V such that the second switch 570 remains off. Accordingly, at the time $t_1$, the selected word line voltage $V_{SEL\_WL}$ at the output node 574 can be set to the boost voltage $V_{boost}$ through the conductive path of the first switch 572. The boost voltage $V_{boost}$ can also be transferred to the WL_near node 580 through the conductive path of the pass transistors 578.

At time $t_2$ (later than time $t_1$, i.e., $t_2 > t_1$), the g_boost signal reduces from the second voltage $V_2$ to 0 V to switch off the first switch 572, and the g_pulse signal increases from 0 V to a third voltage $V_3$ to switch on the second switch 570, while the g_sel signal remains at the first voltage $V_1$ to keep the pass transistors 578 on. Accordingly, at the time $t_2$, the selected word line voltage $V_{SEL\_WL}$ can be adjusted to the regulated voltage $V_{reg}$ through the conductive path of the second switch 570. The regulated voltage $V_{reg}$ can also be transferred to the WL_near node 580 through the conductive path of the pass transistors 578. As such, the electric potential $V_{WL\_near}$ at the WL_near node 580 can be adjusted to voltage levels close to the boost voltage $V_{boost}$ at the time $t_1$ and close to the regulated voltage $V_{reg}$ at the time $t_2$. In some embodiments, due to parasitic resistors and capacitors between the output node 574 and the WL_near node 580, the electric potential $V_{WL\_near}$ can be less than the boost voltage $V_{boost}$ at the time $t_1$ and less than the regulated voltage $V_{reg}$ at the time $t_2$, and can follow the boost voltage $V_{boost}$ and the regulated voltage $V_{reg}$ with a time delay. Voltage drops and ramping delays caused by parasitic resistors and capacitors can be understood by a person skilled in the art, which will not be discussed in details or repeated for each possible instance in this disclosure.

It is noted that the first, second and third voltages V1/V2/V3 can be any suitable voltage for switching on the pass transistors 578, the first switch 572 and the second switch 570. In some embodiments, the first voltage $V_1$ and the third voltage $V_3$ can be set higher than the regulated voltage $V_{reg}$ by a predetermined value, for example, 6 V higher than the regulated voltage $V_{reg}$. In some embodiments, the first voltage $V_1$ and the third voltage $V_3$ can be set at a predetermined value, for example, about 30 V. In some embodiments, the second voltage $V_2$ can be set higher than the boost voltage $V_{boost}$ by a predetermined value, for example, 6 V higher than the boost voltage $V_{boost}$. In some embodiments, the second voltage $V_2$ can be set at a predetermined value, for example, about 15 V. In FIG. 5A, n-channel MOSFETs are used for the pass transistors 578, the first switch 572 and the second switch 570, and thereby positive voltages are used for the first, second and third voltages V1/V2/V3. It is noted that other suitable voltages (e.g., negative voltages) or currents can be used to turn on the pass transistors 578, the first switch 572 and the second switch 570 (e.g., when using p-channel MOSFETs). The first, second and third voltages V1/V2/V3 can be provided by any suitable voltage supply, for example, a level shifter. In some embodiments, the first voltage $V_1$ applied to the g_sel signal can be supplied by a charge pump (e.g., the charge pump 460 in FIG. 4) where the first voltage $V_1$ can follow the waveform of the pump voltage $V_{pump}$.

It should also be understood that the design and layout in FIGS. 5A and 5B are not exhaustive and other electric components and/or arrangements can be implemented as well. For example, the HV switch system 464 can include other transistors connected in parallel with the second switch 570 and the first switch 572 to transfer other voltages (e.g., 0 V, the recover voltage $V_{rcv}$, the second supply voltage $V_{cc}$, as shown in FIG. 4) to the output node 574. Similar designs and signals can be implemented, which are not described here for simplicity.

Figure 6:
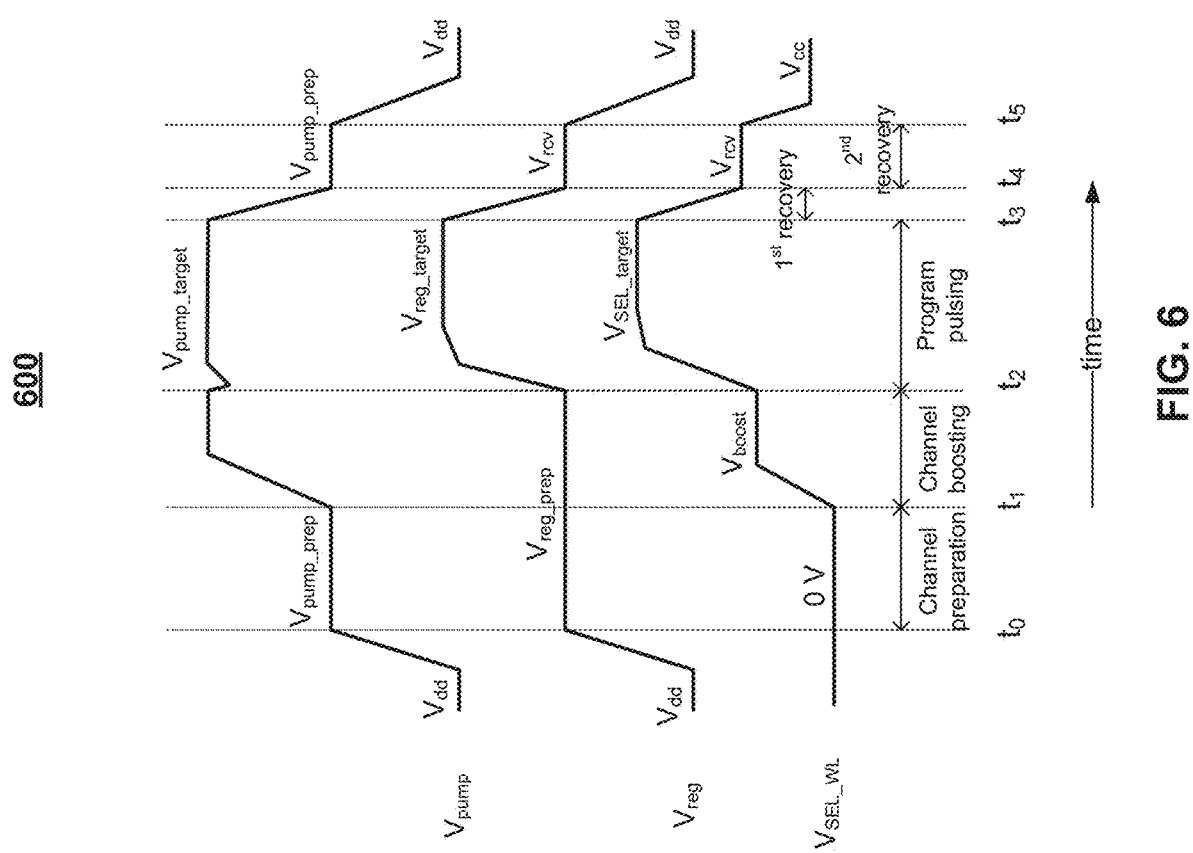
FIGS. 6 and 7 illustrate waveforms of various high voltages used in a programming operation for a selected word line, according to some embodiments of the present disclosure.

FIG. 6 illustrates waveforms 600 of various high voltages used in a programming operation for a selected word line, according to some embodiments of the present disclosure. The programming operation can include multiple stages, for example, a channel preparation stage starting at time to, a channel boosting stage starting at the time $t_1$, a program pulsing stage starting at the time $t_2$, a first recovery stage starting at time $t_3$ after the time $t_2$ and a second recovery stage starting at time $t_4$ after the time $t_3$ and ending at time $t_5$ after the time $t_4$. The high voltages shown in FIG. 6 includes the pump voltage $V_{pump}$ provided by a charge pump (e.g., the charge pump 460 in FIG. 4), the regulated voltage $V_{reg}$ provided by a HV regulator (e.g., the HV regulator 462) and the selected word line voltage $V_{SEL\_WL}$ at the output node 574 of the HV switch system 464 (in FIGS. 4 and 5A).

At the initial time to, the pump voltage $V_{pump}$ can be ramped up from the first supply voltage $V_{dd}$ to a pump preparation voltage $V_{pump\_}$prep. The regulated voltage $V_{reg}$ follows the pump voltage $V_{pump}$ and can be ramped up from the first supply voltage $V_{dd}$ to a regulated preparation voltage $V_{reg\_prep}$. In some embodiments, the pump preparation voltage $V_{pump\_}$prep can be any voltage in a range between 12 V and 18 V. In some embodiments, the pump preparation voltage $V_{pump\_}$prep can be 15 V. In some embodiments, the regulated preparation voltage $V_{reg\_prep}$ can be any voltage in a range between 5 V and 9 V. In some embodiments, the regulated preparation voltage $V_{reg\_prep}$ can be 7 V. At the initial time to, the selected word line voltage $V_{SEL\_WL}$ remains at 0 V, which can be achieved, for example, by selecting the ground connection among the input voltages of the HV switch system 464 in FIG. 4. At the channel preparation stage, the pass transistors 578 of the row decoders/word line drivers 40 can also be switched on to transfer the 0 V from the HV switch system 464 to the selected word lines.

During the channel preparation stage between the initial time to and the time $t_1$, the second switch 570 and the first switch 572 in FIG. 5A can be switched off. The channel preparation stage can be used as a transitional step to stabilize and reduce the ramping time of the pump voltage $V_{pump}$ and the regulated voltage $V_{reg}$ to their respective target values of high voltages.

After the pump voltage $V_{pump}$ and the regulated voltage $V_{reg}$ become stable at the pump preparation voltage $V_{pump\_}$prep and the regulated preparation voltage $V_{reg\_prep}$, respectively, the channel boosting stage starts at the time $t_1$, where the selected word line voltage $V_{SEL\_WL}$ can be ramped to the boost voltage $V_{boost}$. As discussed with respect to FIGS. 5A-5B, ramping the selected word line voltage $V_{SEL\_WL}$ to the boost voltage $V_{boost}$ can be achieved by switching on the first switch 572 and switching off the second switch 570. As discussed previously with respect to FIGS. 5A and 5B, the pass transistors 578 of the row decoders/word line drivers 40 can also be switched on at the time $t_1$. As such, the boost voltage $V_{boost}$ can be transferred to the WL_near node 580 to raise the electric potential $V_{WL\_near}$ to a voltage level equal to or slightly less than the boost voltage $V_{boost}$.

At the channel boosting stage, the regulated voltage $V_{reg}$ can remain at the regulated preparation voltage $V_{reg\_prep}$, while the pump voltage $V_{pump}$ can be ramped to a target pump voltage $V_{pump}$ target. In some embodiments, the target pump voltage $V_{pump}$ target can be any voltage in a range between 25 V and 35 V. In some embodiments, the target pump voltage $V_{pump}$ target can be 30 V.

The program pulsing stage starts at the beginning of the time $t_2$, where the regulated voltage $V_{reg}$ can be ramped to a target regulated voltage $V_{reg\_target}$, and the selected word line voltage $V_{SEL\_WL}$ can be ramped to a target select voltage $V_{SEL\_target}$. Ramping the selected word line voltage $V_{SEL\_WL}$ to the target select voltage $V_{SEL\_target}$ can be achieved by switching off the first switch 572 and switching on the second switch 570, as discussed previously with respect to FIGS. 5A-5B. In some embodiments, the target select voltage $V_{SEL\_target}$ and the target regulated voltage $V_{reg\_target}$ can be similar and can be any voltage in a range between 22 V to 26 V. In some embodiments, due to parasitic resistance and capacitance, the target select voltage $V_{SEL\_target}$ can be slightly less than the target regulated voltage $V_{reg\_target}$, and the selected word line voltage $V_{SEL\_WL}$ can also follow the regulated voltage $V_{reg}$ with a slower ramp rate.

As discussed previously with respect to FIGS. 5B, the pass transistors 578 of the row decoders/word line drivers 40 can also be switched on at the time $t_2$. As such, the target select voltage $V_{SEL\_target}$ can be transferred to the WL_near node 580 to raise the electric potential $V_{WL\_near}$ to a voltage level equal to or slightly less than the target select voltage $V_{SEL\_target}$. In some embodiments, the electric potential $V_{WL\_near}$ at the program pulsing state can reach the programming voltage $V_{pgm}$.

After the programming pulsing stage, during the first recovery stage, the pump voltage $V_{pump}$ and the regulated voltage $V_{reg}$ can be ramped down to the pump preparation voltage $V_{pum\_prep}$ and a recovery voltage $V_{rcv}$, respectively. And the selected word line voltage $V_{SEL\_WL}$ follows the regulated voltage $V_{reg}$ to ramp down to the recovery voltage $V_{rcv}$. After stabling these voltages during the second recovery stage, the pump voltage $V_{pump}$ and the regulated voltage $V_{reg}$ can be ramped down to the first supply voltage $V_{dd}$, and the selected word line voltage $V_{SEL\_WL}$ can be ramped down to the second supply voltage Vec.

Referring to FIGS. 5A-5B and 6, the high voltage circuitry 500A and the waveforms 500B and 600 allow the electric potential $V_{WL\_near}$ of the selected word line to be adjusted close to the boost voltage $V_{boost}$ before ramping to a higher voltage, e.g., ramping to the programming voltage $V_{pgm}$ that is close to the target select voltage $V_{SEL\_target}$. As such, the voltage difference between the selected word line and adjacent unselected word lines, which are biased at the passing voltage $V_{pass}$, can be minimized. Accordingly, programming disturb can be minimized in the adjacent unselected word lines.

However, for the scheme depicted in FIG. 6, the regulated voltage $V_{reg}$ and the selected word line voltage $V_{SEL\_WL}$ ramp to their respective target values during the program pulsing stage at about the same time. Due to parasitic resistances and capacitances, the selected word line voltage $V_{SEL\_WL}$ ramps up at a slower rate than the regulated voltage $V_{reg}$. Thus, to achieve faster programming, it is desirable to ramp up the regulated voltage $V_{reg}$ to the target regulated voltage $V_{reg\_target}$ before the program pulsing stage, e.g., during the channel boosting stage.

Figure 7:
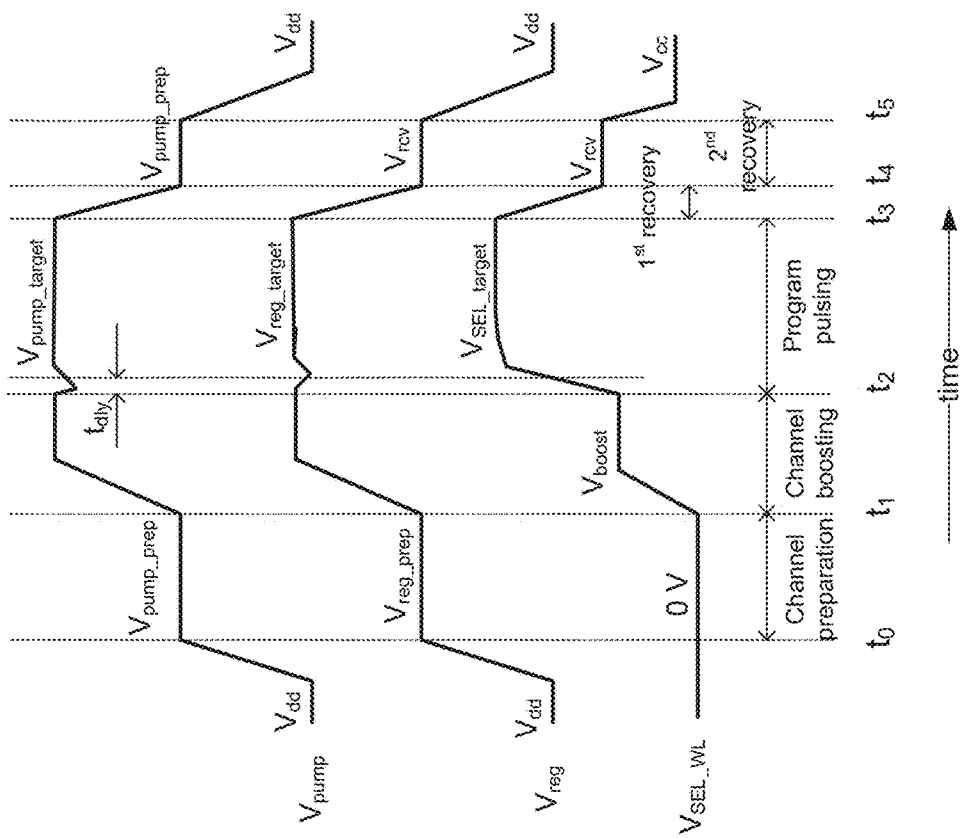

FIG. 7 illustrates waveforms 700 of various high voltages used in a programming operation for a selected word line, according to some embodiments of the present disclosure. The waveforms 700 are similar to the waveforms 600 in FIG. 6, except that the regulated voltage $V_{reg}$ can be ramped up to the target regulated voltage $V_{reg\_target}$ during the channel boosting stage (e.g., starting at the time $t_1$), instead of during the program pulsing stage (e.g., starting at the time $t_2$).

Similar to the scheme in FIG. 6, during the channel boosting stage, the first switch 572 of the HV switch system 464 can be switched on and the second switch 570 can be switched off to set the selected word line voltage $V_{SEL\_WL}$ at the output node 574 to the boost voltage $V_{boost}$. Also similar to the scheme in FIG. 6, during the program pulsing stage, the first switch 572 can be switched off and the second switch 570 can be switched on to set the selected word line voltage $V_{SEL\_WL}$ to regulated voltage $V_{reg}$. However, in the scheme shown in FIG. 7, the regulated voltage $V_{reg}$ has been ramped up to the target regulated voltage $V_{reg\_target}$ during the channel boosting stage. Therefore, when the HV switch system 464 switches on the second switch 570 at the time $t_2$, there can be dips in the pump voltage $V_{pump}$ and the regulated voltage $V_{reg}$. In some embodiment, the dips can be controlled within 100 ns. Therefore, by adding a delay time period $t_{dly}$ in the program pulsing stage, the impact of the dips on the selected word line voltage $V_{SEL\_WL}$ can be negligible.

As discussed above, the scheme and waveforms 700 described in FIG. 7 can improve programming speed when the regulated voltage $V_{reg}$ can be ramped up to the target regulated voltage $V_{reg\_target}$ at an earlier stage (i.e., at the channel boosting stage instead of the program pulsing stage), and the selected word line voltage $V_{SEL\_WL}$ can thereby be ramped up faster to the target select voltage $V_{SEL\_target}$. The issue of the scheme and waveforms 700 described in FIG. 7 is that during the channel boosting stage, the source and drain terminals of the second switch 570 (see FIG. 5A-5B) have a large voltage difference. For example, the drain terminal of the second switch 570 is at the target regulated voltage $V_{reg\_target}$ and the source terminal is at the boost voltage $V_{boost}$. Although the g_pulse signal applied to the gate terminal of the second switch 570 does not switched on the second switch 570, due to large source/drain voltage difference, hot carrier injections can take place between the source and drain terminals. The hot carrier injections can degrade the functionality of the second switch 570 and can cause source and drain breakdown eventually. In one example, the hot carrier injections can cause snack back of the second switch 570. Accordingly, it is desirable to reduce the impact of the hot carrier injections on the switches in the HV switch system 464.

Figure 8A:
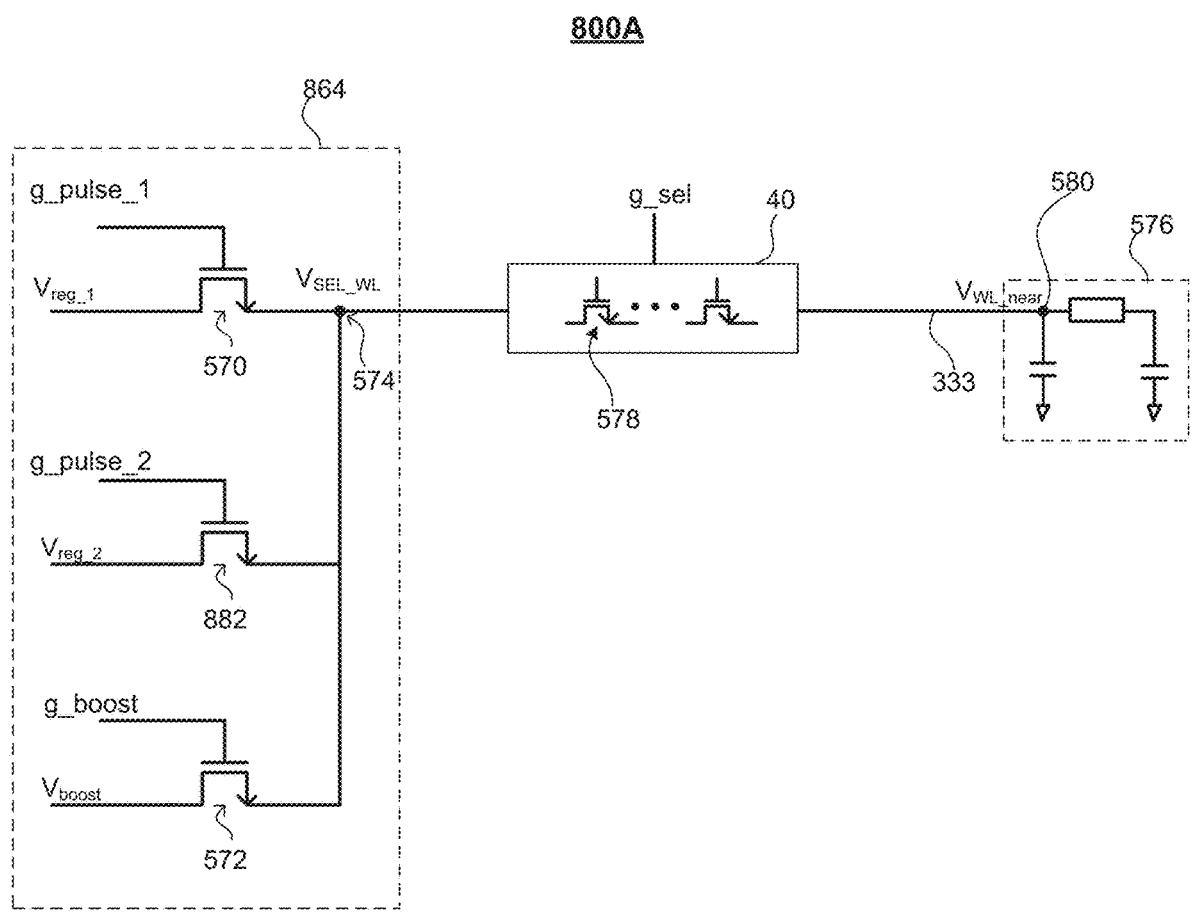
FIG. 8A illustrates a schematic of a high voltage circuitry, according to some embodiments of the present disclosure.

FIG. 8A illustrates a schematic of a high voltage circuitry 800A, according to some embodiments of the present disclosure. The high voltage circuitry 800A is similar to the high voltage circuitry 500A depicted in FIG. 5A, except that the high voltage circuitry 800A includes a HV switch system 864 having a third switch 882. The third switch 882 can include any suitable transistors, for example, bipolar junction transistors (BJTs), field effect transistors (FETs), etc. In some embodiments, the third switch 882 can be metal-oxide-semiconductor field effect transistors (MOSFETs), for example, n-channel MOSFETs.

The third switch 882 can be connected in parallel with the second switch 570 and the first switch 572, where source terminal (or "first terminal") of the third switch 882 can also be electrically connected to the output node 574. Drain terminal (or "second terminal") of the third switch 882 can be coupled to a second regulated voltage $V_{reg\_2}$, while the drain terminal of the second switch 570 can be coupled to a first regulated voltage $V_{reg\_1}$. Gate terminal of the third switch 882 can be controlled by a second gate pulse ("g_pulse_2") signal, while the gate terminal of the second switch 570 can be controlled by a first gate pulse ("g_pulse_1") signal. In some embodiments, the first regulated voltage $V_{reg\_1}$ and the second regulated voltage $V_{reg\_2}$ can be provided by separate HV regulators, where each HV regulator can be similar to the HV regulator 462 in FIG. 4. In some embodiments, the first regulated voltage $V_{reg\_1}$ and the second regulated voltage $V_{reg\_2}$ can be provided by the same HV regulator that is similar to the HV regulator 462 but with different timing controls.

In the configuration in FIG. 8A, the second switch 570 can be switched on/off to set the selected word line voltage $V_{SEL\_WL}$ to the first regulated voltage $V_{reg\_1}$ for a first set of the selected word lines. The third switch 882 can be switched on/off to set the selected word line voltage $V_{SEL\_WL}$ to the second regulated voltage $V_{reg\_2}$ for a second set of the selected word lines that is different from the first set of the selected word lines. Waveforms (e.g., timing and magnitude) of the first regulated voltage $V_{reg\_1}$ and the second regulated voltage $V_{reg\_2}$ can be similar to the regulated voltage $V_{reg}$ shown in FIG. 7. However, unlike in FIG. 7 that regulated voltage $V_{reg}$ is applied to the second switch 570 for each programming operation performed for each selected word line, the first regulated voltage $V_{reg\_1}$ can be applied to the second switch 570 only for programming operations for the first set of the selected word lines. Similarly, the second regulated voltage $V_{reg\_2}$ can be applied to the third switch 882 only for programming operations for the second set of the selected word lines.

By adding one or more transistors (e.g., the third switch 882), the HV switch system 864 can transfer the regulated voltages $V_{reg}$ (e.g., the first regulated voltage $V_{reg\_1}$ for the first set of selected word lines, the second regulated voltage $V_{reg\_2}$ for the second set of selected word lines, . . . , etc.) to the row decoder/word-line driver 40 through different routes and transistors. Accordingly, total stress time from high voltages between the source and drain terminals across a single transistor (e.g., the second switch 570) can be reduced. In the example shown in FIG. 8A, total stress time of the second switch 570 can be reduced by, for example, about 50%. Therefore, the hot carrier injection caused by high voltage across the source and drain terminals can be reduced for the second switch 570.

It is noted that the number of transistors implemented in the HV switch system 864 for transferring the regulated voltage $V_{reg}$ to the selected word lines is not limited to the two transistors (e.g., the second switch 570 and the third switch 882) illustrated in FIG. 8A. Any suitable number of transistors and routing paths can be used. By reducing the cycle time of each transistor, the total stress time from, for example hot carrier injection, can be reduced for each transistor.

Figure 8C:
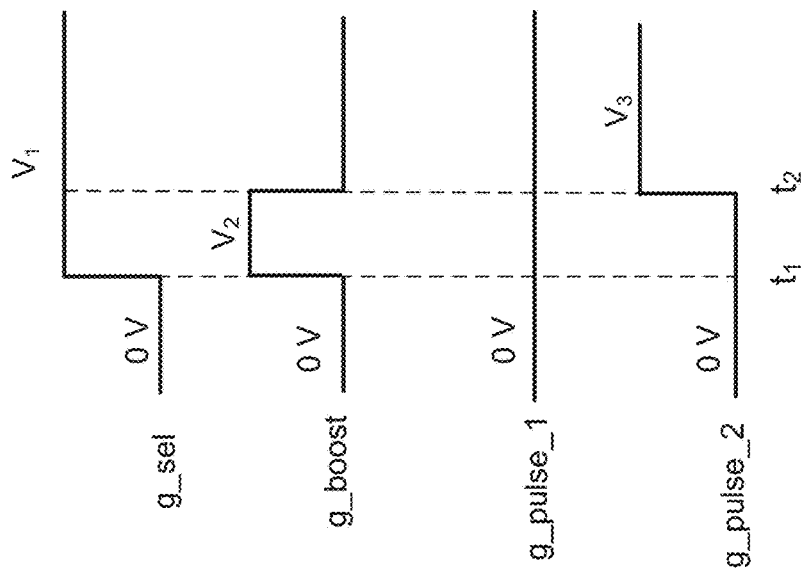
FIGS. 8B and 8C illustrate waveforms of controls signals applied to a high voltage circuitry, according to some embodiments of the present disclosure.
Figure 8B:
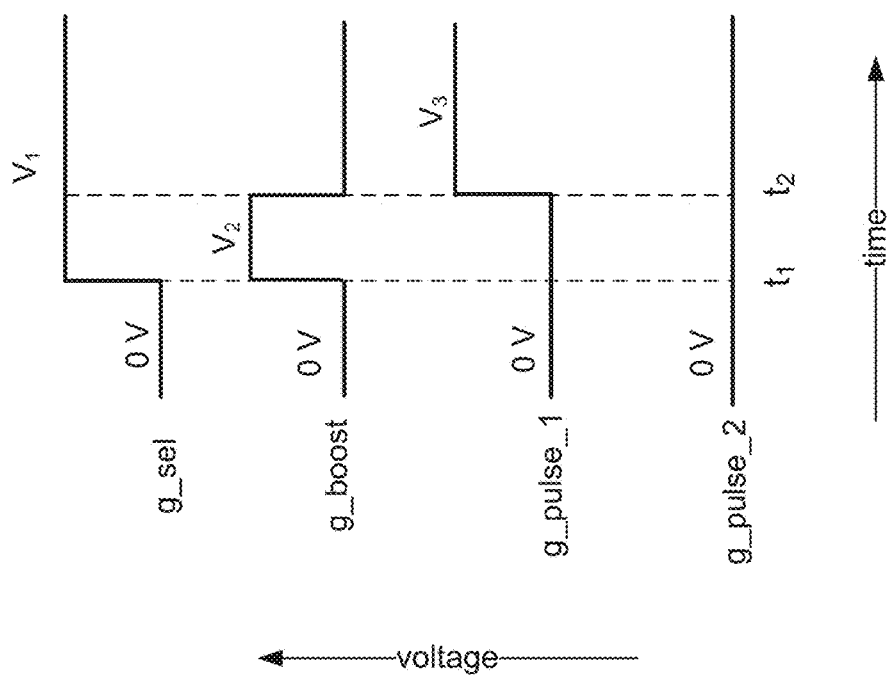

FIGS. 8B and 8C illustrate waveforms 800B and 800C of control signals used for the high voltage circuitry 800A, according to some embodiments of the present disclosure. The control signals include the g_pulse_1 signal, the g_pulse_2 signal, the g_boost signal and the g_sel signal applied to the gate terminals of the second switch 570, the third switch 882, the first switch 572 and the pass transistors 578 in FIG. 8A, respectively.

Similar to the waveforms 500B depicted in FIG. 5B, at the time $t_1$, the g_sel signal and the g_boost signal increase from 0 V to the first voltage $V_1$ and the second voltage $V_2$, respectively, to switch on the pass transistors 578 and the first switch 572 of the HV switch system 864. At the time $t_2$, the g_boost signal reduces from the second voltage $V_2$ to 0 V to switch off the first switch 572, while the g_sel signal remains at the first voltage $V_1$ to keep the pass transistors 578 on.

The key differences between the waveforms 800B/800C and 500B are the timings of the g_pulse_1 signal and the g_pulse_2 signal. The g_pulse_1 signal and the g_pulse_2 signal can be used to switch on/off the second switch 570 and the third switch 882, respectively. The waveforms 800B can be used to program the first set of the selected word lines, and the waveforms 800C can be used to program the second set of the selected word lines.

Figures 9A, 9B:
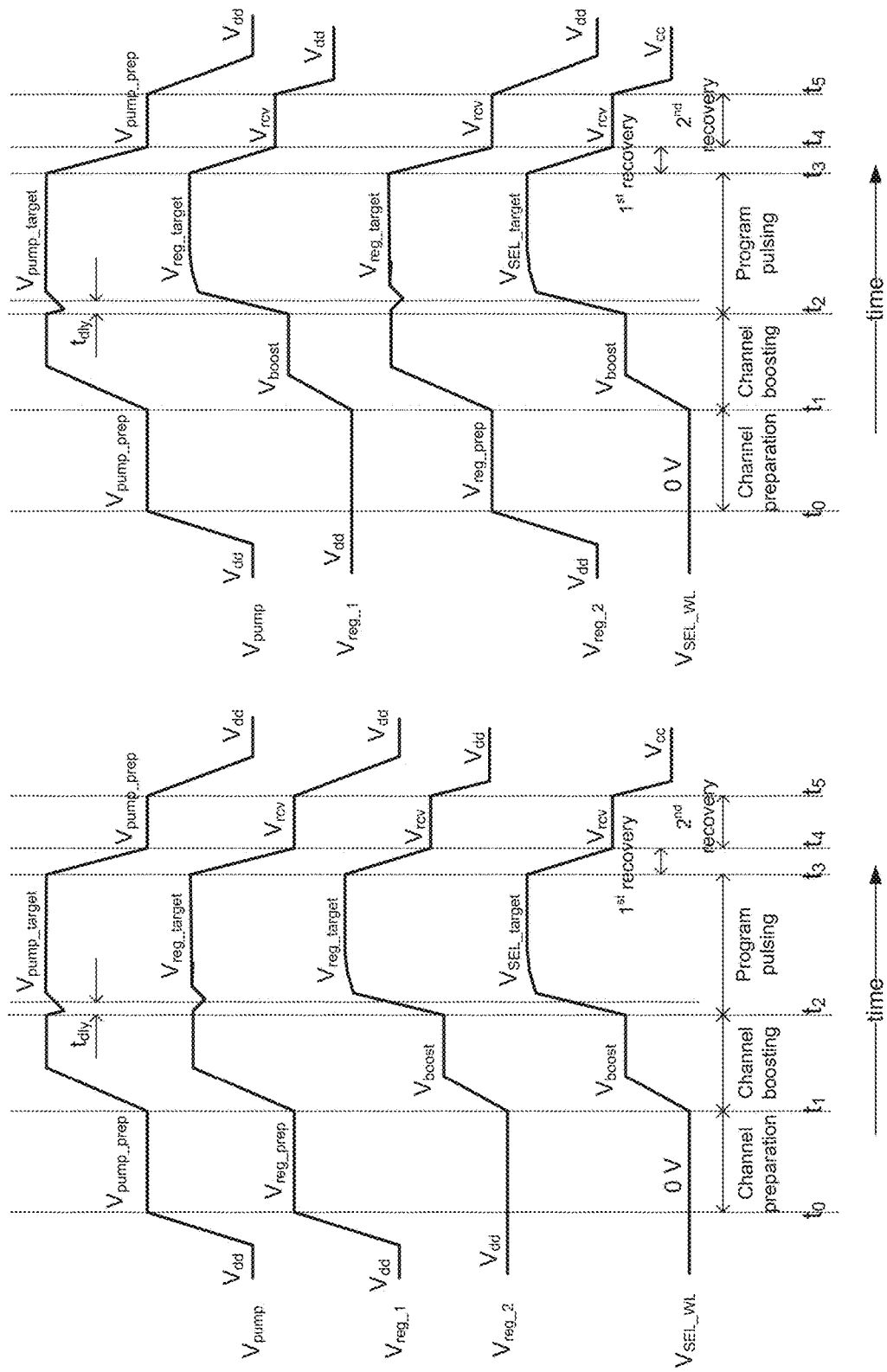
FIGS. 9A and 9B illustrate waveforms of various high voltages for programming memory cells coupled to a first set of selected word lines and a second set of selected word lines, respectively, according to some embodiments of the present disclosure.

During the programming operation for the first set of the selected word lines, the g_pulse_2 signal can be kept at 0 V such that the third switch 882 is switched off, while the g_pulse_1 signal can use the same waveform as the g_pulse signal in 500B for controlling the second switch 570. Namely, at the time $t_1$, the g_pulse_1 signal remains at 0 V such that the second switch 570 remains off. The selected word line voltage $V_{SEL\_WL}$ can be set to the boost voltage $V_{boost}$ through the conductive path of the first switch 572, and the boost voltage $V_{boost}$ can be transferred to the first set of the selected word lines according to the g_sel signal of the row decoders/word line drivers 40. And at the time $t_2$, the g_pulse_1 signal increases from 0 V to the third voltage $V_3$ to switch on the second switch 570. The selected word line voltage $V_{SEL\_WL}$ can be set to the first regulated voltage $V_{reg\_1}$ through the conductive path of the second switch 570, where the first regulated voltage $V_{reg\_1}$ can be transferred to the first set of the selected word lines according to the g_sel signal of the row decoders/word line drivers 40. The waveform of the first regulated voltage $V_{reg\_1}$ can be similar to the regulated voltage $V_{reg}$ in FIG. 7, and is also shown in FIG. 9A.

When programming the first set of the selected word lines, the third switch 882 is switched off according to the g_pulse_2 signal, and therefore the second regulated voltage $V_{reg\_2}$ does not affect the selected word line voltage $V_{SEL\_WL}$ at the output node 574 of the HV switch system 864. During this period, the second regulated voltage $V_{reg\_2}$ can be set at any voltage value to reduce the voltage difference between the source and drain terminals across the third switch 882. In some embodiments, the second regulated voltage $V_{reg\_2}$ can be set at a constant voltage level, for example, an average of the regulated preparation voltage $V_{reg\_prep}$ and the target regulated voltage $V_{reg\_target}$, throughout the programming operation of the first set of the selected word lines. In some embodiments, the second regulated voltage $V_{reg\_2}$ can be set at a constant voltage level, for example, an average of the boost voltage $V_{boost}$ and the target regulated voltage $V_{reg\_target}$, throughout the programming operation of the first set of the selected word lines. In some embodiments, the second regulated voltage $V_{reg\_2}$ can be set to follow the selected word line voltage $V_{SEL\_WL}$ during the channel boosting stage and the program pulsing stage such that the voltage difference between the source and drain terminals across the third switch 882 can be minimized. One example is shown in FIG. 9A, which illustrates waveforms of various high voltages for programming memory cells coupled to the first set of the selected word lines. In this example, at the time $t_1$, the second regulated voltage $V_{reg\_2}$ can be set at the regulated preparation voltage $V_{reg\_prep}$. At the time $t_2$, the second regulated voltage $V_{reg\_2}$ can be set at the target regulated voltage $V_{reg\_target}$. Because the regulated preparation voltage $V_{reg\_prep}$ can be close to the boost voltage $V_{boost}$, at the time $t_1$, the second regulated voltage $V_{reg\_2}$ can be set at the boost voltage $V_{boost}$ also.

Referring to FIG. 8C, during the programming operation for the second set of the selected word lines, the g_pulse_1 signal can be kept at 0 V such that the second switch 570 is switched off, while the g_pulse_2 signal can have the same waveform as the g_pulse signal in 500B for controlling the third switch 882. Namely, at the time $t_1$, the g_pulse_2 signal remains at 0 V such that the third switch 882 remains off. The selected word line voltage $V_{SEL\_WL}$ can be set to the boost voltage $V_{boost}$ through the conductive path of the first switch 572. The boost voltage $V_{boost}$ can then be transferred to the second set of the selected word lines according to the g_sel signal of the row decoders/word line drivers 40. At the time $t_2$, the g_pulse_2 signal increases from 0 V to the third voltage $V_3$ to switch on the third switch 882. The selected word line voltage $V_{SEL\_WL}$ can be set to the second regulated voltage $V_{reg\_2}$ through the conductive path of the third switch 882, and the second regulated voltage $V_{reg\_2}$ can then be transferred to the second set of the selected word lines according to the g_sel signal of the row decoders/word line drivers 40.

When programming the second set of the selected word lines, the second switch 570 is switched off according to the g_pulse_1 signal, and therefore the first regulated voltage $V_{reg\_1}$ does not affect the selected word line voltage $V_{SEL\_WL}$ at the output node 574 of the HV switch system 864. During this period, the first regulated voltage $V_{reg\_1}$ can be set at any voltage value to reduce the voltage difference between the source and drain terminals across the second switch 570. In some embodiments, the first regulated voltage $V_{reg\_1}$ can be set at a constant voltage level, for example, an average of the regulated preparation voltage $V_{reg\_prep}$ and the target regulated voltage $V_{reg\_target}$, throughout the programming operation of the second set of the selected word lines. In some embodiments, the first regulated voltage $V_{reg\_1}$ can be set at a constant voltage level, for example, an average of the boost voltage $V_{boost}$ and the target regulated voltage $V_{reg\_target}$, throughout the programming operation of the first set of the selected word lines. In some embodiments, the first regulated voltage $V_{reg\_1}$ can be set to follow the selected word line voltage $V_{SEL\_WL}$ during the channel boosting stage and the program pulsing stage such that the voltage difference between the source and drain terminals across the second switch 570 can be minimized. This example is shown in FIG. 9B, which illustrates waveforms of various high voltages for programming memory cells coupled to the second set of the selected word lines. In this example, at the time $t_1$, the first regulated voltage $V_{reg\_1}$ can be set at the regulated preparation voltage $V_{reg\_prep}$. At the time $t_2$, the first regulated voltage $V_{reg\_1}$ can be set at the target regulated voltage $V_{reg\_target}$. Because the regulated preparation voltage $V_{reg\_prep}$ can be close to the boost voltage $V_{boost}$, at the time $t_1$, the first regulated voltage $V_{reg\_1}$ can be set at the boost voltage $V_{boost}$ also.

Figure 10:
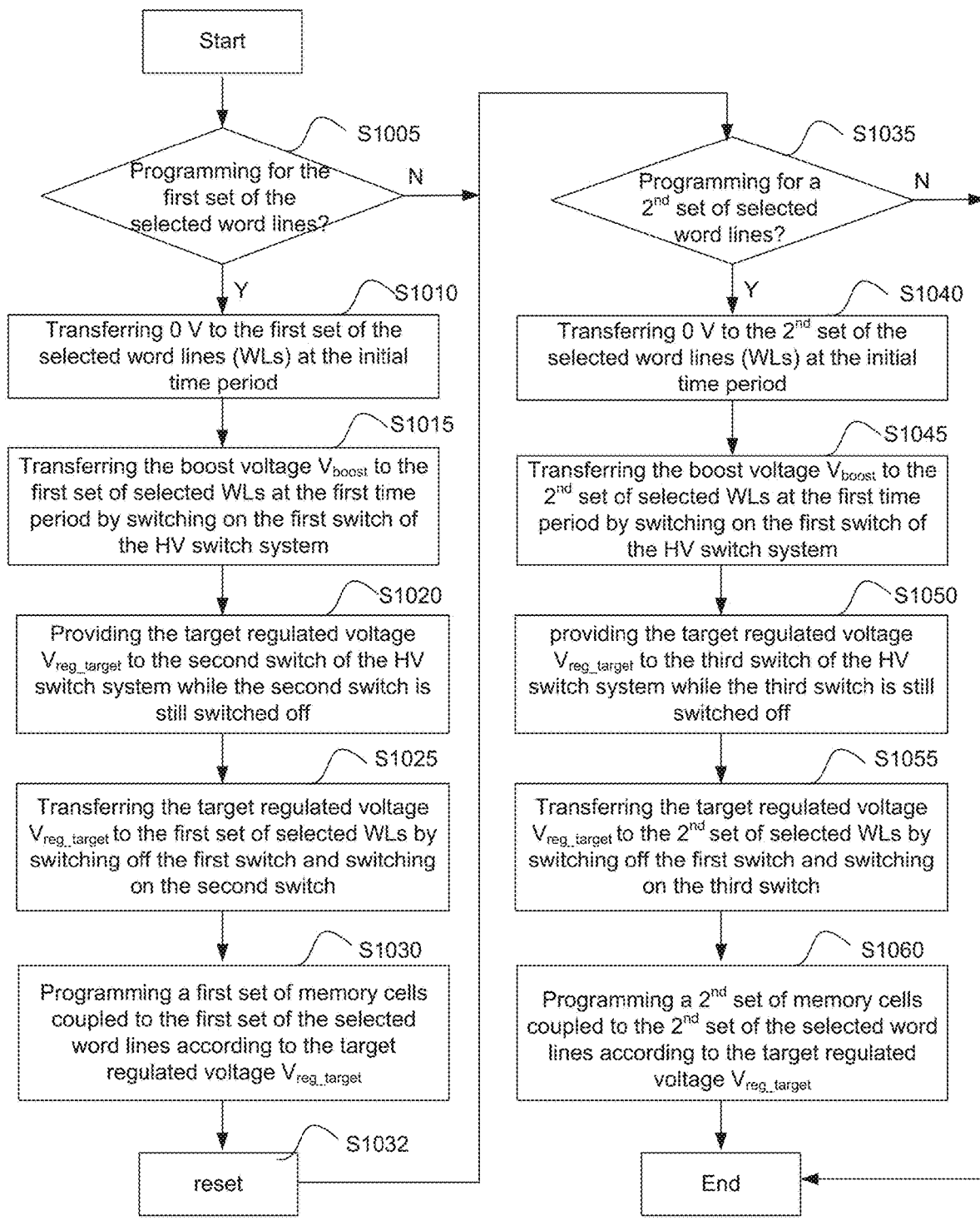
FIG. 10 illustrates a flow diagram of a method for providing high voltages for a set of selected word lines during a programming operation in a NAND flash memory, according to some embodiments of the present disclosure.

FIG. 10 illustrates a flow diagram of a method 1000 for providing high voltages for selected word lines during a programming operation in a NAND flash memory, according to some embodiments of the present disclosure. It should be understood that the method 1000 are not exhaustive and that other operation steps can be performed as well before, after, or between any of the illustrated operation steps. In some embodiments, some operation steps of method 1000 can be omitted or other operation steps can be included, which are not described here for simplicity. In some embodiments, operation steps of method 1000 can be performed in a different order and/or vary.

The method 1000 can be implemented together with the high voltage circuitry 800A and waveforms depicted in FIGS. 8A-8C and 9A-9B. The HV switch system 864 is configured to output the selected word line voltage $V_{SEL\_WL}$ having various voltage levels at different stages of the programming operation.

Initially the first, second and third switches 572/570/882 can be switched off.

At operation step S1005, it is determined if the programming operation is performed for a first set of memory cells coupled to a first set of selected word lines. If yes, the method 1000 proceeds to operation step S1010. Otherwise, the method 1000 proceeds to operation step S1035.

At operation step S1010, the programming operation enters the channel preparation stage for the first set of memory cells coupled to the first set of selected word lines, where the pass transistors of the row decoder/word-line driver 40 can be switched on at the initial time to. The 0 V can be transferred by the HV switch system 864 to the first set of the selected word lines through the row decoder/word-line driver 40. FIG. 8A omits the switch and transfer path for transferring 0 V for simplicity. It should be understood that one or more switches can be connected in parallel with the first, second and third switch 572/570/882 in the HV switch system 864 to transfer one or more voltages to the row decoder/word-line driver 40.

At the channel preparation stage (i.e., an initial time period between the time to and the time $t_1$), the first, second and third switches 572/570/882 can be switched off. The regulated preparation voltage $V_{reg\_prep}$ can be provided to the drain terminal of the second switch 570 by a HV regulator, which can be similar to the HV regulator 462 described in FIG. 4.

At operation step S1015, the programming operation enters the channel boosting stage (i.e., a first time period between the time $t_1$ and the time $t_2$) for the first set of memory cells coupled to the first set of selected word lines, where the boost voltage $V_{boost}$ can be transferred by switching on the first switch 572 at the time $t_1$ ($t_1 > t_0$). Accordingly, the HV switch system 864 can output the selected word line voltage $V_{SEL\_WL}$ having a value that is close to the boost voltage $V_{boost}$, where the selected word line voltage $V_{SEL\_WL}$ can then be transferred by the row decoder/word-line driver 40 to the first set of the selected word lines. The first set of the selected word lines can be applied with the boost voltage $V_{boost}$ during the channel boosting stage such that programming disturb to adjacent unselected word lines can be minimized in the subsequent program pulsing stage. In some embodiments, the boost voltage $V_{boost}$ can be supplied by a boost voltage power supply.

At operation step S1020, the target regulated voltage $V_{reg\_target}$ can be provided to the drain terminal of the second switch 570 of the HV switch system 864, while the second switch 570 is still switched off. The target regulated voltage $V_{reg\_target}$ can be provided by the HV regulator, which can be ramped up from the regulated preparation voltage $V_{reg\_prep}$.

In some embodiments, the boost voltage $V_{boost}$ or the regulated preparation voltage $V_{reg\_prep}$ can be provide to the drain terminal of the third switch 882, while the third switch 882 is also switched off at the operation step S1020. Accordingly, the source and drain terminals of the third switch 882 can have similar voltages and stress from, e.g., hot carrier injections, can be minimized for the third switch 882 when programming the first set of memory cells coupled to the first set of selected word lines.

At operation step S1025, the programming operation enters the program pulsing stage (i.e., a second time period between the time $t_2$ and the time $t_3$) for the first set of memory cells coupled to the first set of selected word lines, where the first switch 572 can be switched off and the second switch 570 can be switched on at the time $t_2$ ($t_2 > t_1$). As such, the target regulated voltage Veg target can be transferred through the second switch 570. Accordingly, the HV switch system 864 can output the selected word line voltage $V_{SEL\_WL}$ having a value, i.e., the target select voltage $V_{SEL\_target}$ that is close to the target regulated voltage $V_{reg\_target}$, where the target select voltage $V_{SEL\_target}$ can then be transferred by the row decoder/word-line driver 40 to the first set of the selected word lines.

At the operation step S1025, the third switch 882 remains off. To minimize the voltage difference between the source and drain terminals of the third switch 882, in some embodiments, the target regulated voltage $V_{reg\_target}$ can also be supplied to the drain terminal of the third switch 882.

At operation step S1030, the first set of memory cells coupled to the first set of the selected word lines can be programmed at the programming voltage $V_{pgm}$, where the programming voltage $V_{pgm}$ is the target regulated voltage $V_{reg\_target}$ minus possible voltage drops due to parasitic resistance and capacitance along the conductive path through the second switch 570 and the pass transistors 578 of the row decoder/word-line driver 40.

After programming the first set of memory cells coupled to the first set of the selected word lines, the second switch 570 can be switched off. The programming operation for the first set of memory cells coupled to the first set of the selected word lines can be completed after the first recovery stage (i.e., a third time period between the time $t_3$ and the time $t_4$) and the second recovery stage (i.e., a fourth time period between the time $t_4$ and the time $t_5$), which are omitted here for simplicity.

At operation step S1032, all the switches of the HV switch system can be reset, i.e., be switched off.

At operation step S1035, it is determined if the programming operation is performed for a second set of memory cells coupled to a second set of selected word lines that is different from the first set of selected word lines. If yes, the method 1000 proceeds to operation step S1040.

At operation step S1040, the programming operation enters the channel preparation stage for the second set of memory cells coupled to the second set of selected word lines. Similar to the operation step S1010, the pass transistors of the row decoder/word-line driver 40 can be switched on. And 0 V can be transferred by the HV switch system 864 to the second set of the selected word lines through the row decoder/word-line driver 40.

At the channel preparation stage, the first, second and third switches 572/570/882 can be switched off. In one example, the regulated preparation voltage $V_{reg\_prep}$ can be provided to the drain terminal of the third switch 882 by the HV regulator (referring to FIGS. 8A and 9B), similar to the operation step S1010.

In another example, the same HV regulator can be used to provide the target regulated voltage Veg target for all selected word lines for programming operations. To save time for ramping up and ramping down, a separate power supply can be used to provide the recovery voltage $V_{rev}$ at the first and second recovery stages, where the recovery voltage $V_{rev}$ can be transferred by the HV switch system through an additional switch connected parallel to the first, the second and the third switches 572/570/882. In this example, there is no need to provide the regulated preparation voltage $V_{reg\_prep}$ to the drain terminal of the third switch 882 at operation step S1040.

At operation step S1045, the programming operation enters the channel boosting stage for the second set of memory cells coupled to the second set of selected word lines. Similar to the operation step S1015, the boost voltage $V_{boost}$ can be transferred by switching on the first switch 572 at the time $t_1$. The boost voltage $V_{boost}$ can then be transferred by the row decoder/word-line driver 40 to the second set of the selected word lines.

At operation step S1050, the target regulated voltage $V_{reg\_target}$ can be provided to the drain terminal of the third switch 882 of the HV switch system 864, while the third switch 882 is still switched off at operation step S1050. The target regulated voltage $V_{reg\_target}$ can be supplied by the HV regulator.

In some embodiments, the boost voltage $V_{boost}$ or the regulated preparation voltage $V_{reg\_prep}$ can be provide to the drain terminal of the second switch 570, while the second switch 570 is also switched off at the operation step S1050. Accordingly, the source and drain terminals of the second switch 570 can have similar voltages and stress from, e.g., hot carrier injections, can be minimized for the second switch 570 when programming the second set of memory cells coupled to the second set of selected word lines.

At operation step S1055, the programming operation enters the program pulsing stage for the second set of memory cells coupled to the second set of selected word lines, where the first switch 572 can be switched off and the third switch 882 can be switched on at the time $t_2$ ($t_2 > t_1$). As such, the target regulated voltage $V_{reg\_target}$ can be transferred through the third switch 882. Accordingly, the HV switch system 864 can output the selected word line voltage $V_{SEL\_WL}$ having a value, i.e., the target select voltage $V_{SEL\_target}$ that is close to the target regulated voltage $V_{reg\_target}$, where the target select voltage $V_{SEL\_target}$ can then be transferred by the row decoder/word-line driver 40 to the second set of the selected word lines.

At the operation step S1055, the second switch 570 remains off. To minimize the voltage difference between the source and drain terminals of the second switch 570, in some embodiments, the target regulated voltage $V_{reg\_target}$ can also be provided to the drain terminal of the second switch 570.

At operation step S1060, the second set of memory cells coupled to the second set of the selected word lines can be programmed at the programming voltage $V_{pgm}$, where the programming voltage $V_{pgm}$ is the target regulated voltage $V_{reg\_target}$ minus possible voltage drops due to parasitic resistance and capacitance along the conductive path through the third switch 882 and the pass transistors 578 of the row decoder/word-line driver 40.

After programming the second set of memory cells coupled to the second set of the selected word lines, the third switch 882 can be switched off. The programming operation for the second set of memory cells coupled to the second set of the selected word lines can be completed after the first recovery stage and the second recovery stage, which are omitted here for simplicity.

Figure 11:
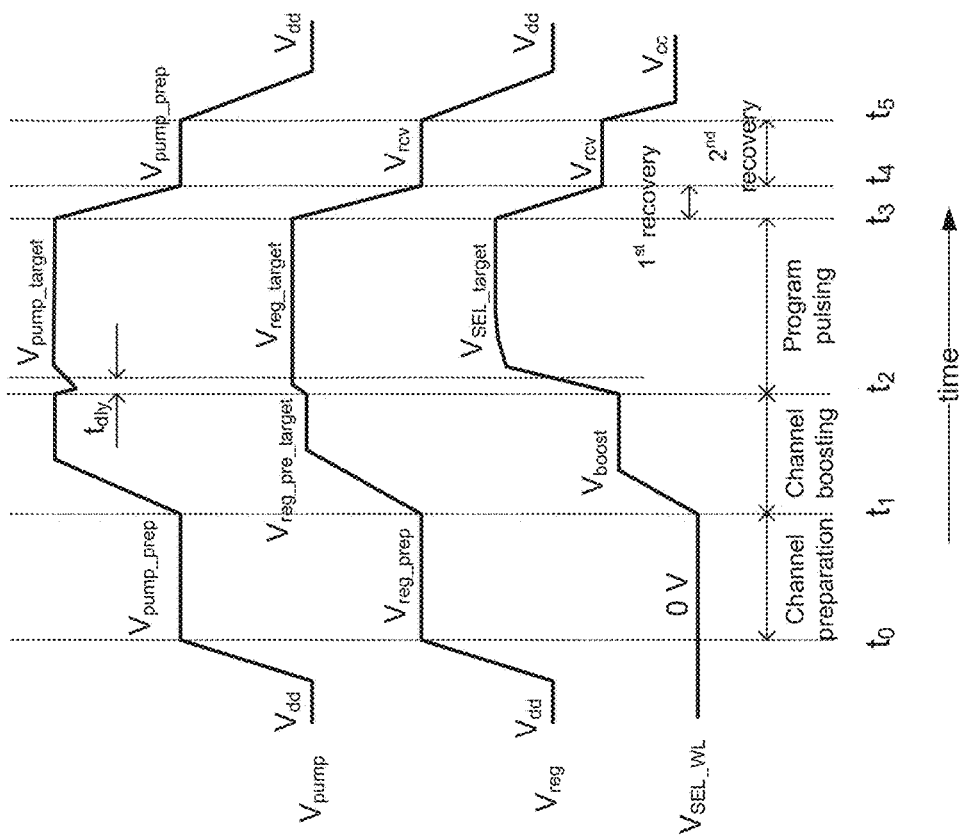
FIG. 11 illustrates waveforms of various high voltages used in a programming operation for a selected word line, according to some embodiments of the present disclosure.

FIG. 11 illustrates waveforms 1100 of various high voltages used for a programming operation for a selected word line, according to some embodiments of the present disclosure. The waveforms 1100 can be implemented with the high voltage circuitry 500A and waveforms depicted in FIGS. 5A-5C. Waveforms 1100 are similar to the waveforms 700 depicted in FIG. 7, except that during the channel boosting stage, the regulated voltage $V_{reg}$ can be ramped up to a pre-target regulated voltage $V_{reg\_pre\_target}$ that is slightly less than the target regulated voltage $V_{reg\_target}$. The difference between the target regulated voltage $V_{reg\_target}$ and the pre-target regulated voltage $V_{reg\_pre\_target}$ can be any suitable voltage, for example, in a range between 0.5 V to 5 V, preferably between 1 V to 3 V to minimize the impact on the ramp up speed and variation of the selected word line voltage $V_{SEL\_WL}$. In some embodiments, the difference between the target regulated voltage $V_{reg\_target}$ and the pre-target regulated voltage $V_{reg\_pre\_target}$ can be 2 V. As discussed previously, during the channel boosting stage, the selected word line voltage $V_{SEL\_WL}$ at the output node 574 is close to the boost voltage $V_{boost}$. The source and drain terminals of the second switch 570 are at the boost voltage $V_{boost}$ and the pre-target regulated voltage $V_{reg\_pre\_target}$, respectively. By reducing the regulated voltage $V_{reg}$ during the channel boosting stage, the voltage difference between the source and drain terminals of the second switch 570 can be reduced, e.g., from $|V_{reg\_target}-V_{boost}|$ to $|V_{reg\_pre\_target}-V_{boost}|$. As such, stress (e.g., hot carrier injections) on the second switch 570 can also be reduced.

It is noted that the circuits and methods described in this disclosure are not limited to high voltages for a programming operation or a selected word line. Similar circuit and method can be implemented to other operations (e.g., an erase operation or a read operation) and can be implemented to unselected word lines or selected/unselected bit lines, or generally to other applications in a memory device.

In summary, the present disclosure provides a high voltage (HV) switch system for a memory device that includes a first switch configured to transfer a boost voltage during a first time period to a first set of selected word lines or a second set of selected word lines of the memory device; a second switch configured to transfer a target regulated voltage during a second time period to the first set of the selected word lines when programming a first set of memory cells coupled to the first set of the selected word lines; and a third switch configured to transfer the target regulated voltage during the second time period to the second set of the selected word lines that is different from the first set of word lines when programming a second set of memory cells coupled to the second set of the selected word lines. First terminals of the first switch, the second switch and the third switch are electrically connected to an output node of the HV switch system; and second terminals of the first switch, the second switch and the third switch are coupled to the boost voltage, a first regulated voltage, and a second regulated voltage, respectively.

The present disclosure also provides a method for programming a memory device, which includes transferring, during a first time period, a boost voltage to a first set of selected word lines or a second set of selected word lines of the memory device through a first switch of a high voltage (HV) switch system of the memory device; and transferring, during a second time period, a target regulated voltage to the first set of the selected word lines through a second switch of the HV switch system, or to the second set of the selected word lines through a third switch of the HV switch system. The second set of the selected word lines are different from the first set of selected word lines; and the first switch, the second switch and the third switch are connected in parallel. The method further includes programming, according to the target regulated voltage, a first set of memory cells coupled to the first set of the selected word lines, or a second set of memory cells coupled to the second set of the selected word lines during the second time period, wherein the target regulated voltage is supplied to the third switch when programming the first set of memory cells, and to the second switch when programming the second set of memory cells.

The present disclosure further provides a memory device that includes a memory array having a first set of memory cells coupled to a first set of selected word lines and a second set of memory cells coupled to a second set of selected word lines. The memory device also includes peripheral circuits having a row decoder/word-line driver; a high voltage (HV) regulator configured to provide a target regulated voltage; and a HV switch system. The HV switch system includes a first switch configured to transfer a boost voltage during a first time period to the first set of selected word lines or the second set of selected word lines; a second switch configured to transfer the target regulated voltage during a second time period to the first set of the selected word lines when programming the first set of memory cells; and a third switch configured to transfer the target regulated voltage during the second time period to the second set of the selected word lines that is different from the first set of word lines when programming the second set of memory cells.

The present disclosure also provides a memory system that includes a memory device and a memory controller. The memory device includes a memory array comprising a first set of memory cells coupled to a first set of selected word lines and a second set of memory cells coupled to a second set of selected word lines; and peripheral circuits comprising a row decoder/word-line driver; a high voltage (HV) regulator configured to provide a target regulated voltage; and a HV switch system. The HV switch system includes a first switch configured to transfer a boost voltage during a first time period to the first set of selected word lines or the second set of selected word lines; a second switch configured to transfer the target regulated voltage during a second time period to the first set of the selected word lines when programming the first set of memory cells; and a third switch configured to transfer the target regulated voltage during the second time period to the second set of the selected word lines that is different from the first set of word lines when programming the second set of memory cells. The memory controller configured to send commands to the memory device for programming the first set of memory cells and the second set of memory cells.

The foregoing description of the specific embodiments will so fully reveal the general nature of the present disclosure that others can, by applying knowledge within the skill of the art, readily modify and/or adapt, for various applications, such specific embodiments, without undue experimentation, and without departing from the general concept of the present disclosure. Therefore, such adaptations and modifications are intended to be within the meaning and range of equivalents of the disclosed embodiments, based on the disclosure and guidance presented herein. It is to be understood that the phraseology or terminology herein is for the purpose of description and not of limitation, such that the terminology or phraseology of the present specification is to be interpreted by the skilled artisan in light of the disclosure and guidance.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The Summary and Abstract sections can set forth one or more but not all exemplary embodiments of the present disclosure as contemplated by the inventor(s), and thus, are not intended to limit the present disclosure and the appended claims in any way.

The breadth and scope of the present disclosure should not be limited by any of the above-described exemplary embodiments, but should be defined only in accordance with the following claims and their equivalents.

What is claimed is:

1. A memory device, comprising a high voltage (HV) switch system comprising:
  a first switch configured to transfer a boost voltage during a first time period to a first set of selected word lines or a second set of selected word lines of the memory device;
  a second switch configured to transfer a target regulated voltage during a second time period to the first set of selected word lines when programming a first set of memory cells coupled to the first set of selected word lines; and
  a third switch configured to transfer the target regulated voltage during the second time period to the second set of selected word lines that is different from the first set of selected word lines when programming a second set of memory cells coupled to the second set of selected word lines, wherein:
  respective first terminals of the first switch, the second switch and the third switch are electrically connected to an output node of the HV switch system; and
  respective second terminals of the first switch, the second switch and the third switch are coupled to the boost voltage, a first regulated voltage, and a second regulated voltage, respectively.

2. The memory device of claim 1, wherein the first switch, the second switch and the third switch each comprises a metal-oxide-semiconductor field effect transistor (MOSFET), and wherein the first terminal and the second terminal of the first switch, the second switch and the third switch are source and drain terminals, respectively.

3. The memory device of claim 1, wherein the output node of the HV switch system is coupled to a row decoder/word-line driver of the memory device, the row decoder/word-line driver of the memory device configured to:
  transfer the boost voltage during the first time period to the first set of selected word lines or the second set of selected word lines;
  transfer the target regulated voltage during the second time period to the first set of selected word lines when programming the first set of memory cells; and
  transfer the target regulated voltage during the second time period to the second set of selected word lines when programming the second set of memory cells.

4. The memory device of claim 1, wherein, when programming the first set of memory cells, the first regulated voltage has a value of the target regulated voltage during the first time period and the second time period.

5. The memory device of claim 4, wherein the second regulated voltage has the value of the target regulated voltage during the second time period.

6. The memory device of claim 1, wherein, when programming the second set of memory cells, the second regulated voltage has a value of the target regulated voltage during the first time period and the second time period.

7. The memory device of claim 6, wherein the first regulated voltage is based on the target regulated voltage during the second time period.

8. The memory device of claim 1, wherein, when programming the first set of memory cells, the first regulated voltage has a value of a pre-target regulated voltage during the first time period and has a value of the target regulated voltage during the second time period, wherein the pre-target regulated voltage is lower in value than the target regulated voltage.

9. The memory device of claim 8, wherein the second regulated voltage has the value of the target regulated voltage during the second time period.

10. The memory device of claim 1, wherein, when programming the second set of memory cells, the second regulated voltage has a value of a pre-target regulated voltage during the first time period and has a value of the target regulated voltage during the second time period, wherein the pre-target regulated voltage is lower in value than the target regulated voltage.

11. The memory device of claim 10, wherein the first regulated voltage has a value of the target regulated voltage during the second time period.

12. The memory device of claim 1, wherein the target regulated voltage is supplied by a HV regulator.

13. A method for programming a memory device, comprising:
  transferring, during a first time period, a boost voltage to a first set of selected word lines or a second set of selected word lines of the memory device through a first switch of a high voltage (HV) switch system of the memory device;
  transferring, during a second time period, a target regulated voltage to the first set of the selected word lines through a second switch of the HV switch system, or to the second set of selected word lines through a third switch of the HV switch system, wherein:
  the second set of selected word lines are different from the first set of selected word lines; and
  the first switch, the second switch and the third switch each having a terminal connected in parallel to the first set of selected word lines or to the second set of selected word lines; and
  programming, according to the target regulated voltage, a first set of memory cells coupled to the first set of selected word lines, or a second set of memory cells coupled to the second set of selected word lines during the second time period, wherein:
  the target regulated voltage is supplied to the third switch when programming the first set of memory cells, and to the second switch when programming the second set of memory cells.

14. The method of claim 13, wherein:
  the transferring of the boost voltage comprises switching on the first switch and switching off the second switch and the third switch;
  the transferring of the target regulated voltage to the first set of selected word lines comprises switching off the first switch and the third switch and switching on the second switch; and
  the transferring of the target regulated voltage to the second set of selected word lines comprises switching off the first switch and the second switch and switching on the third switch.

15. The method of claim 13, further comprising:
  supplying, during the first time period, the target regulated voltage to the second switch when transferring the boost voltage to the first set of selected word lines; and supplying, during the first time period, the target regulated voltage to the third switch when transferring the boost voltage to the second set of selected word lines.

16. The method of claim 13, further comprising:

supplying, during the first time period, a pre-target regulated voltage to the second switch when transferring the boost voltage to the first set of selected word lines, wherein the pre-target regulated voltage is lower in value than the target regulated voltage; and supplying, during the first time period, the pre-target regulated voltage to the third switch when transferring the boost voltage to the second set of selected word lines.

17. A memory system, comprising:

a memory device, comprising:

a memory array, comprising a first set of memory cells coupled to a first set of selected word lines and a second set of memory cells coupled to a second set of selected word lines; and peripheral circuits, comprising:

a row decoder/word-line driver;

a high voltage (HV) regulator configured to provide a target regulated voltage; and a HV switch system, comprising:

a first switch configured to transfer a boost voltage during a first time period to the first set of selected word lines or the second set of selected word lines;

a second switch configured to transfer the target regulated voltage during a second time period to the first set of selected word lines when programming the first set of memory cells; and a third switch configured to transfer the target regulated voltage during the second time period to the second set of selected word lines that is different from the first set of selected word lines when programming the second set of memory cells; and a memory controller configured to send commands to the memory device for programming the first set of memory cells and the second set of memory cells.

18. The memory system of claim 17, wherein first terminals of the first switch, the second switch and the third switch are coupled to the row decoder/word-line driver.

19. The memory system of claim 17, wherein a second terminal of the second switch is coupled to the HV regulator when programming the first set of memory cells.

20. The memory system of claim 17, wherein a second terminal of the third switch is coupled to the HV regulator when programming the second set of memory cells.

* * * * *